(12) United States Patent
Huepeden et al.

(10) Patent No.: US 12,447,121 B2
(45) Date of Patent: Oct. 21, 2025

(54) COMPOSITION FOR PROMOTING THE SKIN MICROBIOME

(71) Applicant: BEIERSDORF AG, Hamburg (DE)

(72) Inventors: Jennifer Huepeden, Hamburg (DE); Mirja Laschet, Hamburg (DE); Karen Tom Dieck, Hamburg (DE); Heike Foelster, Hamburg (DE); Sabine Sellkau, Hamburg (DE)

(73) Assignee: BEIERSDORF AG, Hamburg (DE)

( * ) Notice: Subject to any disclaimer, the term of this patent is extended or adjusted under 35 U.S.C. 154(b) by 0 days.

(21) Appl. No.: 18/245,583

(22) PCT Filed: Sep. 22, 2021

(86) PCT No.: PCT/EP2021/076117
§ 371 (c)(1),
(2) Date: Mar. 16, 2023

(87) PCT Pub. No.: WO2022/063857
PCT Pub. Date: Mar. 31, 2022

(65) Prior Publication Data
US 2023/0363998 A1    Nov. 16, 2023

Related U.S. Application Data

(63) Continuation-in-part of application No. 17/189,496, filed on Mar. 2, 2021, now abandoned.

(30) Foreign Application Priority Data

Sep. 22, 2020 (EP) .................... 20197602
Sep. 22, 2020 (EP) .................... 20197604
Mar. 2, 2021 (EP) .................... 21160322
Mar. 2, 2021 (EP) .................... 21160323

(51) Int. Cl.
  *A61K 8/60*    (2006.01)
  *A61K 8/365*   (2006.01)
  *A61K 8/37*    (2006.01)
  *A61K 8/44*    (2006.01)
  *A61Q 19/00*   (2006.01)

(52) U.S. Cl.
  CPC ............ *A61K 8/60* (2013.01); *A61K 8/365* (2013.01); *A61K 8/375* (2013.01); *A61K 8/44* (2013.01); *A61Q 19/00* (2013.01)

(58) Field of Classification Search
  CPC .................................... A61K 8/60
  See application file for complete search history.

(56) References Cited

U.S. PATENT DOCUMENTS

2015/0118173 A1 *  4/2015  Farwick ............... A61Q 19/00
                                                        424/68
2017/0143621 A1    5/2017  Baum et al.
2019/0060193 A1    2/2019  Schmaus et al.

FOREIGN PATENT DOCUMENTS

DE        4341001 A1 *  6/1995  .......... A61K 31/505
WO    2017087640 A1    5/2017

OTHER PUBLICATIONS

Byrd et al., The human skin microbiome, Nature Reviews Microbiology vol. 16, pp. 143-155 (2018).*
Lactil® Product data record, Evonik industries, Edition 5, Jan. 28, 2008, Mt. No. 300020.*
Database GNPD [Online] Mintel; Jul. 5, 2016, anonymous, "Hand Cream", Database accession No. 4119633.*
Database GNPD [Online] Mintel; Jun. 30, 2020, anonymous, "Natural Moisturizing Factors + HATM", Database accession No. 7913427.*
Database GNPD [Online] Mintel; Jun. 6, 2019 (1019-09-06), anonymous: "5% Urea Nourishing Balm", Database accession No. 6601965.*
Anonymous, An overview of dermatology, Created 2008, available at https://dermnetnz.org/cme/principles/an-overview-of-dermatology.*
Chia, Probiotic Skin Care Is a Lie, Nov. 23, 2021, available at https://www.allure.com/story/probiotic-skin-care-microbiome-definition.*
Anonymous, "Sym-Micro Essence", GNPD, Mintel, (May 19, 2020), Database accession No. 7607177, URL: https://www.gnpd.com/sinatra/recordpage/7607177/.
Anonymous, "Urea Plus Reparative Emollient", GNPD, Mintel, (Jan. 24, 2018), Database accession No. 5403283, URL: https://www.gnpd.com/sinatra/recordpage/5403283/.
Database GNPD [Online] Mintel; Jun. 6, 2019 (Jun. 6, 2019), anonymous: "5% Urea Nourishing Balm".
Database GNPD [Online] Mintel; Jun. 30, 2020 (Jun. 30, 2020), anonymous: "Natural Moisturizing Factors +HA".

* cited by examiner

*Primary Examiner* — Svetlana M Ivanova
(74) *Attorney, Agent, or Firm* — Abel Schillinger, LLP

(57) ABSTRACT

The present invention generally relates to the field of skin care. More particularly, the invention relates to a skin care composition that comprises growth-enhancing compounds which promote the development of a healthy skin microbiome. These growth-enhancing compounds are metabolized by the microorganisms of the skin microbiome after their topical application to the skin, thereby supporting growth of the microorganisms. The growth-enhancing compounds and compositions comprising same can be used for treating or preventing skin diseases, for promoting the development of a healthy skin microbiome, for stabilizing a healthy skin microbiome, and for promoting growth of bacteria of the skin microbiome.

20 Claims, 4 Drawing Sheets a: low nutrient medium
b: Pyruvate
c: Pyruvate + Urea
d: Pyruvate + Urea + Caprylic/Capric Triglycerides
e: Pyruvate + Caprylic/Capric Triglycerides
f: Lactate
g: Lactate + Urea
h: Lactate + Urea + Caprylic/Capric Triglycerides
i: Lactate + Caprylic/Capric Triglycerides
j: Caprylic/Capric Triglycerides
k: Urea
l: Urea + Caprylic/Capric Triglycerides

- a: low nutrient medium
- b: Alanine
- c: Arginine
- d: Alanine + Arginine
- e: Pyruvate
- f: Pyruvate + Alanine
- g: Pyruvate + Arginine

COMPOSITION FOR PROMOTING THE SKIN MICROBIOME

FIELD OF THE INVENTION

The present invention generally relates to the field of skin care. More particularly, the invention relates to a skin care composition that comprises growth-enhancing compounds which promote the development of a healthy skin microbiome. These growth-enhancing compounds are metabolized by the microorganisms of the skin microbiome after their topical application to the skin, thereby supporting growth of the microorganisms. The growth-enhancing compounds and compositions comprising same can be used for treating or preventing skin diseases, for promoting the development of a healthy skin microbiome, for stabilizing a healthy skin microbiome, and for promoting growth of bacteria of the skin microbiome.

BACKGROUND OF THE INVENTION

The human skin is colonized by millions of microorganisms, in particular bacteria and fungi. Most of these microorganisms are harmless or even beneficial to their host. The entirety of the microorganisms living on the human skin is referred to as the "skin microbiome". There is emerging evidence that the skin microbiome has a direct influence on human health. For example, bacteria of the skin microbiome contribute to health by secreting antimicrobial compounds that provide a barrier to infection of the body with pathogenic bacteria or fungi. In addition, the skin microbiome interacts with the immune system and effectively stimulates the immune system to combat pathogenic bacteria and fungi.

The human skin is a habitat that is generally unfavorable for microorganisms. The skin is salty, dry and continuously exposed to UV radiation. In addition, the availability of nutrients on the skin surface is limited to compounds that are released from dead skin cells of the upper epidermal layer. Due to these harsh conditions, the overall number of bacterial and fungal cells on skin is rather low, especially in dry areas such as the forearm, leg and lower back. Daily washing the skin with soap as well as the use of inappropriate cosmetic products provide additional antimicrobial effects which further reduce the overall number of bacterial and fungal cells on skin and may result in a disturbance of the skin microbiome.

In a healthy microbiome, there appears to be a balance of the resident microorganisms with respect to each other. A disturbance of said balance is thought to contribute to diseases or disorders, such as acne or eczema. In particular, if the number of bacteria from the resident flora, such as *Staphylococcus epidermidis*, becomes too low, there is a risk that the skin is colonized with pathogenic or potentially pathogenic bacteria, such as *Staphylococcus aureus*. A healthy and stable microbiome normally prevents the colonization of the skin with such pathogenic or potentially pathogenic bacteria. Accordingly, there is a need for means and methods that result in the maintenance of a healthy skin microbiome. In addition, there is a need for means and methods that could promote growth of the resident microorganisms in the microbiome.

SUMMARY OF THE INVENTION

It has been found in the course of the present invention that it is possible to actively support a balanced microbiome by application of a skin care composition that comprises a high amount of compounds which can be metabolized by the microorganisms of the skin microbiome, thereby promoting their growth. In particular, it has been found that certain compounds, upon their topical application to the skin, can be used as carbon, nitrogen, or lipid source by the microorganisms of the skin microbiome. The topical application of such compounds therefore provides improved metabolic conditions for these microorganisms on the skin surface.

The growth-enhancing compounds disclosed herein are metabolized by the resident microorganisms, i.e. the microorganisms that normally occur as part of the human skin microbiome, much more effective compared to transient microorganisms which colonize the skin only temporarily, e.g. after touching contaminated objects with the hands. As a result, the compounds disclosed herein provide a growth advantage to resident microorganisms, such as *S. epidermidis*, over pathogenic microorganisms like *S. aureus*. In this way, these compounds assist in stabilizing and promoting growth of the resident microorganisms of the skin microbiome.

Accordingly, in a first aspect, the present invention relates to a skin care composition for promoting the skin microbiome, wherein said composition is formulated for topical application to the skin and comprises
  (a) a carbon source selected from the group consisting of glucose, fructose, saccharose, maltose, maltodextrin, pyruvic acid, pyruvate, lactic acid and/or lactate.

Apart from the carbon source, the skin care composition of the present invention further comprises at least one of following components:
  (b) a nitrogen source selected from the group of alanine, glycine, arginine and/or urea;
  (c) caprylic/capric triglycerides as a lipid source.

Hence, the invention relates to a composition for promoting the skin microbiome which comprises a carbon source, which either is glucose, fructose, saccharose, maltose, maltodextrin, pyruvic acid, pyruvate, lactic acid, lactate or a combination of any of theses, and at least one additional growth-enhancing compound. The additional growth-enhancing compound can be a nitrogen source selected from urea, alanine, glycine and arginine or caprylic/capric triglycerides as a lipid source. In a particularly preferred embodiment, the composition of the invention comprises all three types of components. Accordingly, in a preferred aspect, the invention relates to a skin care composition for promoting the skin microbiome, wherein said composition is formulated for topical application to the skin and comprises
  (a) glucose, fructose, saccharose, maltose, maltodextrin, pyruvic acid, pyruvate, lactic acid, and/or lactate as a carbon source,
  (b) alanine, glycine, arginine and/or urea as a nitrogen source,
  (c) caprylic/capric triglycerides as a lipid source.

Preferably, the present invention relates to a skin care composition for promoting the skin microbiome, wherein said composition is formulated for topical application to the skin and comprises
  (a) pyruvic acid, pyruvate, lactic acid, lactate or mixtures thereof as a carbon source.

Apart from the carbon source, the skin care composition of the present invention further comprises at least one of following components:
  (b) urea and/or arginine as a nitrogen source;
  (c) caprylic/capric triglycerides as a lipid source.

Hence, the invention also relates to a composition for promoting the skin microbiome which comprises a carbon source, which either is pyruvic acid, pyruvate, lactic acid, lactate or mixtures thereof, e.g. a combination of pyruvate and lactate, and at least one additional growth-enhancing compound. The additional growth-enhancing compound can be a nitrogen source selected from urea and arginine or caprylic/capric triglycerides as a lipid source. In a particularly preferred embodiment, the composition of the invention comprises all three types of components. Accordingly, in a preferred aspect, the invention relates to a skin care composition for promoting the skin microbiome, wherein said composition is formulated for topical application to the skin and comprises (a) pyruvic acid, pyruvate lactic acid, lactate or mixtures thereof as a carbon source,
(b) urea and/or arginine as a nitrogen source,
(c) caprylic/capric triglycerides as a lipid source.

In a particularly preferred aspect, the invention relates to a skin care composition for promoting the skin microbiome, wherein said composition is formulated for topical application to the skin and comprises (a) pyruvic acid, pyruvate or mixtures thereof as a carbon source,
(b) urea and/or arginine as a nitrogen source,
(c) optionally, caprylic/capric triglycerides as a lipid source.

In one preferred embodiment of the invention, the composition of the invention comprises pyruvic acid, pyruvate or mixtures thereof as a carbon source. If pyruvic acid is used, it will normally dissociate to some extent in aqueous solution. Therefore, it will be present in an aqueous environment as a mixture of undissociated pyruvic acid and the corresponding salt pyruvate. As shown in the below examples, pyruvic acid and pyruvate are able to significantly increase the cell number of the resident bacteria when applied in the form of a skin care composition to the facial skin. As used herein, pyruvate refers to a salt or ester of 2-oxopropanoic acid. Preferably, the pyruvate in the composition is calcium or sodium pyruvate. Sodium pyruvate is used in some cosmetic compositions for stimulating collagen synthesis.

A preferred skin care composition of the invention comprises the following:

(a) pyruvic acid, pyruvate or mixtures thereof as a carbon source,
(b) urea as a nitrogen source, and
(c) as an optional component, caprylic/capric triglycerides as a lipid source.

It is preferred that the pyruvic acid, pyruvate or the mixture of both components is present in the composition in an amount of 0.05 to 5.0% (w/w), more preferably 0.1 to 5.0% (w/w), more preferably 0.2 to 4.5% (w/w), more preferably 0.3 to 4.0% (w/w), more preferably 0.4 to 3.5% (w/w), more preferably 0.5 to 3.0% (w/w), more preferably 0.6 to 2.5% (w/w), more preferably 0.7 to 2.0% (w/w), more preferably 0.8 to 1.5% (w/w), such as 1.0% (w/w). An amount of 0.05 to 1.0% (w/w) is particularly preferred. In some embodiments, the amount of pyruvic acid, pyruvate or mixtures thereof present in the composition is at least 0.3 (w/w), at least 0.4 (w/w), at least 0.5 (w/w), at least 0.6 (w/w), at least 0.7 (w/w), at least 0.8 (w/w), at least 0.9 (w/w), at least 1.0 (w/w), at least 2.0 (w/w), or at least 3.0 (w/w). All weight percentages mentioned herein in relation to certain components refer, unless stated otherwise, to the total weight of the preparation or composition.

Similarly, it is preferred that the urea is present in the composition in an amount of 0.05 to 5.0% (w/w), more preferably 0.1 to 5.0% (w/w), more preferably 0.2 to 4.5% (w/w), more preferably 0.3 to 4.0% (w/w), more preferably 0.4 to 3.5% (w/w), more preferably 0.5 to 3.0% (w/w), more preferably 0.6 to 2.5% (w/w), more preferably 0.7 to 2.0% (w/w), more preferably 0.8 to 1.5% (w/w), such as 1.0% (w/w). In some embodiments, the amount of urea present in the composition is at least 0.3 (w/w), at least 0.4 (w/w), at least 0.5 (w/w), at least 0.6 (w/w), at least 0.7 (w/w), at least 0.8 (w/w), at least 0.9 (w/w), at least 1.0 (w/w), at least 2.0 (w/w), or at least 3.0 (w/w).

This composition may optionally include caprylic/capric triglycerides as a lipid source. As used herein, the term "caprylic/capric triglycerides" refers to triglycerides in which the glycerol is esterified with the fatty acids caprylic acid and capric acid. The caprylic/capric triglycerides are preferably present in an amount of 0.1 to 6.0% (w/w), more preferably 0.2 to 6.0% (w/w), more preferably 0.3 to 5.5% (w/w), more preferably 0.4 to 5.0% (w/w), more preferably 0.5 to 4.5% (w/w), more preferably 0.6 to 4.0% (w/w), more preferably 0.7 to 3.5% (w/w), more preferably 0.8 to 3.0% (w/w), more preferably 0.9 to 2.5% (w/w), more preferably 1.0 to 3.0% (w/w), more preferably 1.5 to 2.5% (w/w), such as 2.0% (w/w). In some embodiments, the amount of caprylic/capric triglycerides present in the composition is at least 0.3 (w/w), at least 0.4 (w/w), at least 0.5 (w/w), at least 0.6 (w/w), at least 0.7 (w/w), at least 0.8 (w/w), at least 0.9 (w/w), at least 1.0 (w/w), at least 2.0 (w/w), at least 3.0 (w/w), at least 4.0 (w/w), or at least 5.0 (w/w).

Another preferred skin care composition of the invention comprises the following:

(a) pyruvic acid, pyruvate or mixtures thereof as a carbon source,
(b) arginine a as a nitrogen source, and
(c) as an optional component, caprylic/capric triglycerides as a lipid source.

The pyruvic acid, pyruvate or the mixtures of both components is preferably present in the composition in an amount as outlined above. The arginine is preferably present in the composition in an amount of 0.05 to 5.0% (w/w), more preferably 0.1 to 5.0% (w/w), more preferably 0.2 to 4.5% (w/w), more preferably 0.3 to 4.0% (w/w), more preferably 0.4 to 3.5% (w/w), more preferably 0.5 to 3.0% (w/w), more preferably 0.6 to 2.5% (w/w), more preferably 0.8 to 2.0% (w/w), more preferably 0.9 to 1.5% (w/w), such as 1.0% (w/w). In some embodiments, the amount of arginine present in the composition is at least 0.3 (w/w), at least 0.4 (w/w), at least 0.5 (w/w), at least 0.6 (w/w), at least 0.7 (w/w), at least 0.8 (w/w), at least 0.9 (w/w), at least 1.0 (w/w), at least 2.0 (w/w), or at least 3.0 (w/w). This composition may optionally include caprylic/capric triglycerides as a lipid source. If present, the caprylic/capric triglycerides are preferably used in the amounts outlines above.

Another preferred skin care composition of the invention comprises the following:

(a) pyruvic acid, pyruvate or mixtures thereof as a carbon source,
(b) glycine as a nitrogen source, and
(c) as an optional component, caprylic/capric triglycerides as a lipid source.

The pyruvic acid, pyruvate or the mixture of both components is preferably present in the composition in an amount as outlined above. The glycine is preferably present in the composition in an amount of 0.05 to 5.0% (w/w), more preferably 0.1 to 5.0% (w/w), more preferably 0.2 to 4.5% (w/w), more preferably 0.3 to 4.0% (w/w), more preferably 0.4 to 3.5% (w/w), more preferably 0.5 to 3.0% (w/w), more preferably 0.6 to 2.5% (w/w), more preferably 0.8 to 2.0% (w/w), more preferably 0.9 to 1.5% (w/w), such as 1.0%

(w/w). In some embodiments, the amount of glycine present in the composition is at least 0.3 (w/w), at least 0.4 (w/w), at least 0.5 (w/w), at least 0.6 (w/w), at least 0.7 (w/w), at least 0.8 (w/w), at least 0.9 (w/w), at least 1.0 (w/w), at least 2.0 (w/w), or at least 3.0 (w/w). This composition may optionally include caprylic/capric triglycerides as a lipid source. If present, the caprylic/capric triglycerides are preferably used in the amounts outlines above.

Another preferred skin care composition of the invention comprises the following:
(a) pyruvic acid, pyruvate or mixtures thereof as a carbon source,
(b) alanine a as a nitrogen source, and
(c) as an optional component, caprylic/capric triglycerides as a lipid source.

The pyruvic acid, pyruvate or the mixture of both components is preferably present in the composition in an amount as outlined above. The alanine is preferably present in the composition in an amount of 0.05 to 5.0% (w/w), more preferably 0.1 to 5.0% (w/w), more preferably 0.2 to 4.5% (w/w), more preferably 0.3 to 4.0% (w/w), more preferably 0.4 to 3.5% (w/w), more preferably 0.5 to 3.0% (w/w), more preferably 0.6 to 2.5% (w/w), more preferably 0.8 to 2.0% (w/w), more preferably 0.9 to 1.5% (w/w), such as 1.0% (w/w). In some embodiments, the amount of alanine present in the composition is at least 0.3 (w/w), at least 0.4 (w/w), at least 0.5 (w/w), at least 0.6 (w/w), at least 0.7 (w/w), at least 0.8 (w/w), at least 0.9 (w/w), at least 1.0 (w/w), at least 2.0 (w/w), or at least 3.0 (w/w). This composition may optionally include caprylic/capric triglycerides as a lipid source. If present, the caprylic/capric triglycerides are preferably used in the amounts outlines above.

In another embodiment of the invention, the composition of the invention comprises lactic acid, lactate or mixtures thereof as a carbon source. Like pyruvate, lactic and lactate are able to increase the cell number of the resident bacteria when applied to the facial skin. As used herein, lactate refers to a salt or ester of lactic acid. If lactic acid is used, it will normally dissociate to some extent in aqueous solution. Therefore, it will be present in an aqueous environment as a mixture of undissociated lactic acid and the corresponding salt lactate. Preferably, the lactate in the composition is calcium or sodium lactate. Sodium lactate is used as a humectant in some cosmetic compositions as well as for pH stabilization. Preferred skin care compositions of the invention that comprise lactate as a growth-enhancing component, include:

A preferred skin care composition of the invention comprises the following:
(a) lactic acid, lactate or mixtures thereof as a carbon source,
(b) urea as a nitrogen source, and
(c) as an optional component, caprylic/capric triglycerides as a lipid source.

It is preferred that the lactic acid, lactate or the mixture of both components is present in the composition in an amount of 0.05 to 5.0% (w/w), more preferably 0.1 to 5.0% (w/w), more preferably 0.2 to 4.5% (w/w), more preferably 0.3 to 4.0% (w/w), more preferably 0.4 to 3.5% (w/w), more preferably 0.5 to 3.0% (w/w), more preferably 0.6 to 2.5% (w/w), more preferably 0.7 to 2.0% (w/w), more preferably 0.8 to 1.5% (w/w), such as 1.0% (w/w). In some embodiments, the amount of lactic acid, lactate or the mixture of both components present in the composition is at least 0.3 (w/w), at least 0.4 (w/w), at least 0.5 (w/w), at least 0.6 (w/w), at least 0.7 (w/w), at least 0.8 (w/w), at least 0.9 (w/w), at least 1.0 (w/w), at least 2.0 (w/w), or at least 3.0 (w/w).

Similarly, it is preferred that the urea is present in the composition in an amount of 0.05 to 5.0% (w/w), more preferably 0.1 to 5.0% (w/w), more preferably 0.2 to 4.5% (w/w), more preferably 0.3 to 4.0% (w/w), more preferably 0.4 to 3.5% (w/w), more preferably 0.5 to 3.0% (w/w), more preferably 0.6 to 2.5% (w/w), more preferably 0.7 to 2.0% (w/w), more preferably 0.8 to 1.5% (w/w), such as 1.0% (w/w). In some embodiments, the amount of urea present in the composition is at least 0.3 (w/w), at least 0.4 (w/w), at least 0.5 (w/w), at least 0.6 (w/w), at least 0.7 (w/w), at least 0.8 (w/w), at least 0.9 (w/w), at least 1.0 (w/w), at least 2.0 (w/w), or at least 3.0 (w/w).

This composition may optionally include caprylic/capric triglycerides as a lipid source. The caprylic/capric triglycerides are preferably present in an amount of 0.1 to 6.0% (w/w), more preferably 0.2 to 6.0% (w/w), more preferably 0.3 to 5.5% (w/w), more preferably 0.4 to 5.0% (w/w), more preferably 0.5 to 4.5% (w/w), more preferably 0.6 to 4.0% (w/w), more preferably 0.7 to 3.5% (w/w), more preferably 0.8 to 3.0% (w/w), more preferably 0.9 to 2.5% (w/w), more preferably 1.0 to 3.0% (w/w), more preferably 1.5 to 2.5% (w/w), such as 2.0% (w/w). In some embodiments, the amount of caprylic/capric triglycerides present in the composition is at least 0.3 (w/w), at least 0.4 (w/w), at least 0.5 (w/w), at least 0.6 (w/w), at least 0.7 (w/w), at least 0.8 (w/w), at least 0.9 (w/w), at least 1.0 (w/w), at least 2.0 (w/w), at least 3.0 (w/w), at least 4.0 (w/w), or at least 5.0 (w/w).

Another preferred skin care composition of the invention comprises the following:
(a) lactic acid, lactate or the mixture thereof as a carbon source,
(b) arginine a as a nitrogen source, and
(c) as an optional component, caprylic/capric triglycerides as a lipid source.

The lactic acid, lactate, or the mixture of both components is preferably present in the composition in an amount as outlined above. The arginine is preferably present in the composition in an amount of 0.05 to 5.0% (w/w), more preferably 0.1 to 5.0% (w/w), more preferably 0.2 to 4.5% (w/w), more preferably 0.3 to 4.0% (w/w), more preferably 0.4 to 3.5% (w/w), more preferably 0.5 to 3.0% (w/w), more preferably 0.6 to 2.5% (w/w), more preferably 0.8 to 2.0% (w/w), more preferably 0.9 to 1.5% (w/w), such as 1.0% (w/w). In some embodiments, the amount of arginine present in the composition is at least 0.3 (w/w), at least 0.4 (w/w), at least 0.5 (w/w), at least 0.6 (w/w), at least 0.7 (w/w), at least 0.8 (w/w), at least 0.9 (w/w), at least 1.0 (w/w), at least 2.0 (w/w), or at least 3.0 (w/w). This composition may optionally include caprylic/capric triglycerides as a lipid source. If present, the caprylic/capric triglycerides are preferably used in the amounts outlines above.

Another preferred skin care composition of the invention comprises the following:
(a) lactic acid, lactate or the mixture thereof as a carbon source,
(b) glycine a as a nitrogen source, and
(c) as an optional component, caprylic/capric triglycerides as a lipid source.

The lactic acid, lactate, or the mixture of both components is preferably present in the composition in an amount as outlined above. The glycine is preferably present in the composition in an amount of 0.05 to 5.0% (w/w), more preferably 0.1 to 5.0% (w/w), more preferably 0.2 to 4.5% (w/w), more preferably 0.3 to 4.0% (w/w), more preferably 0.4 to 3.5% (w/w), more preferably 0.5 to 3.0% (w/w), more preferably 0.6 to 2.5% (w/w), more preferably 0.8 to 2.0% (w/w), more preferably 0.9 to 1.5% (w/w), such as 1.0% (w/w). In some embodiments, the amount of glycine present in the composition is at least 0.3 (w/w), at least 0.4 (w/w), at least 0.5 (w/w), at least 0.6 (w/w), at least 0.7 (w/w), at least 0.8 (w/w), at least 0.9 (w/w), at least 1.0 (w/w), at least 2.0 (w/w), or at least 3.0 (w/w). This composition may optionally include caprylic/capric triglycerides as a lipid source. If present, the caprylic/capric triglycerides are preferably used in the amounts outlines above.

Another preferred skin care composition of the invention comprises the following:
(a) lactic acid, lactate, or the mixture of both components as a carbon source,
(b) alanine a as a nitrogen source, and
(c) as an optional component, caprylic/capric triglycerides as a lipid source.

The lactic acid, lactate, or the mixture of both components is preferably present in the composition in an amount as outlined above. The alanine is preferably present in the composition in an amount of 0.05 to 5.0% (w/w), more preferably 0.1 to 5.0% (w/w), more preferably 0.2 to 4.5% (w/w), more preferably 0.3 to 4.0% (w/w), more preferably 0.4 to 3.5% (w/w), more preferably 0.5 to 3.0% (w/w), more preferably 0.6 to 2.5% (w/w), more preferably 0.8 to 2.0% (w/w), more preferably 0.9 to 1.5% (w/w), such as 1.0% (w/w). In some embodiments, the amount of alanine present in the composition is at least 0.3 (w/w), at least 0.4 (w/w), at least 0.5 (w/w), at least 0.6 (w/w), at least 0.7 (w/w), at least 0.8 (w/w), at least 0.9 (w/w), at least 1.0 (w/w), at least 2.0 (w/w), or at least 3.0 (w/w). This composition may optionally include caprylic/capric triglycerides as a lipid source. If present, the caprylic/capric triglycerides are preferably used in the amounts outlines above.

Another preferred skin care composition of the invention comprises the following:
(a) glucose as a carbon source,
(b) urea as a nitrogen source, and
(c) as an optional component, caprylic/capric triglycerides as a lipid source.

It is preferred that the glucose is present in the composition in an amount of 0.05 to 5.0% (w/w), more preferably 0.1 to 5.0% (w/w), more preferably 0.2 to 4.5% (w/w), more preferably 0.3 to 4.0% (w/w), more preferably 0.4 to 3.5% (w/w), more preferably 0.5 to 3.0% (w/w), more preferably 0.6 to 2.5% (w/w), more preferably 0.7 to 2.0% (w/w), more preferably 0.8 to 1.5% (w/w), such as 1.0% (w/w). An amount of 0.05 to 1.0% (w/w) is particularly preferred. In some embodiments, the amount of glucose present in the composition is at least 0.3 (w/w), at least 0.4 (w/w), at least 0.5 (w/w), at least 0.6 (w/w), at least 0.7 (w/w), at least 0.8 (w/w), at least 0.9 (w/w), at least 1.0 (w/w), at least 2.0 (w/w), or at least 3.0 (w/w).

Similarly, it is preferred that the urea is present in the composition in an amount of 0.05 to 5.0% (w/w), more preferably 0.1 to 5.0% (w/w), more preferably 0.2 to 4.5% (w/w), more preferably 0.3 to 4.0% (w/w), more preferably 0.4 to 3.5% (w/w), more preferably 0.5 to 3.0% (w/w), more preferably 0.6 to 2.5% (w/w), more preferably 0.7 to 2.0% (w/w), more preferably 0.8 to 1.5% (w/w), such as 1.0% (w/w). In some embodiments, the amount of urea present in the composition is at least 0.3 (w/w), at least 0.4 (w/w), at least 0.5 (w/w), at least 0.6 (w/w), at least 0.7 (w/w), at least 0.8 (w/w), at least 0.9 (w/w), at least 1.0 (w/w), at least 2.0 (w/w), or at least 3.0 (w/w).

This composition may optionally include caprylic/capric triglycerides as a lipid source. The caprylic/capric triglycerides are preferably present in an amount of 0.1 to 6.0% (w/w), more preferably 0.2 to 6.0% (w/w), more preferably 0.3 to 5.5% (w/w), more preferably 0.4 to 5.0% (w/w), more preferably 0.5 to 4.5% (w/w), more preferably 0.6 to 4.0% (w/w), more preferably 0.7 to 3.5% (w/w), more preferably 0.8 to 3.0% (w/w), more preferably 0.9 to 2.5% (w/w), more preferably 1.0 to 3.0% (w/w), more preferably 1.5 to 2.5% (w/w), such as 2.0% (w/w). In some embodiments, the amount of caprylic/capric triglycerides present in the composition is at least 0.3 (w/w), at least 0.4 (w/w), at least 0.5 (w/w), at least 0.6 (w/w), at least 0.7 (w/w), at least 0.8 (w/w), at least 0.9 (w/w), at least 1.0 (w/w), at least 2.0 (w/w), at least 3.0 (w/w), at least 4.0 (w/w), or at least 5.0 (w/w).

Another preferred skin care composition of the invention comprises the following:
(a) glucose as a carbon source,
(b) arginine a as a nitrogen source, and
(c) as an optional component, caprylic/capric triglycerides as a lipid source.

The glucose is preferably present in the composition in an amount as outlined above. The arginine is preferably present in the composition in an amount of 0.05 to 5.0% (w/w), more preferably 0.1 to 5.0% (w/w), more preferably 0.2 to 4.5% (w/w), more preferably 0.3 to 4.0% (w/w), more preferably 0.4 to 3.5% (w/w), more preferably 0.5 to 3.0% (w/w), more preferably 0.6 to 2.5% (w/w), more preferably 0.8 to 2.0% (w/w), more preferably 0.9 to 1.5% (w/w), such as 1.0% (w/w). In some embodiments, the amount of arginine present in the composition is at least 0.3 (w/w), at least 0.4 (w/w), at least 0.5 (w/w), at least 0.6 (w/w), at least 0.7 (w/w), at least 0.8 (w/w), at least 0.9 (w/w), at least 1.0 (w/w), at least 2.0 (w/w), or at least 3.0 (w/w). This composition may optionally include caprylic/capric triglycerides as a lipid source. If present, the caprylic/capric triglycerides are preferably used in the amounts outlines above.

Another preferred skin care composition of the invention comprises the following:
(a) glucose as a carbon source,
(b) glycine a as a nitrogen source, and
(c) as an optional component, caprylic/capric triglycerides as a lipid source.

The glucose is preferably present in the composition in an amount as outlined above. The glycine is preferably present in the composition in an amount of 0.05 to 5.0% (w/w), more preferably 0.1 to 5.0% (w/w), more preferably 0.2 to 4.5% (w/w), more preferably 0.3 to 4.0% (w/w), more preferably 0.4 to 3.5% (w/w), more preferably 0.5 to 3.0% (w/w), more preferably 0.6 to 2.5% (w/w), more preferably 0.8 to 2.0% (w/w), more preferably 0.9 to 1.5% (w/w), such as 1.0% (w/w). In some embodiments, the amount of glycine present in the composition is at least 0.3 (w/w), at least 0.4 (w/w), at least 0.5 (w/w), at least 0.6 (w/w), at least 0.7 (w/w), at least 0.8 (w/w), at least 0.9 (w/w), at least 1.0 (w/w), at least 2.0 (w/w), or at least 3.0 (w/w). This composition may optionally include caprylic/capric triglycerides as a lipid source. If present, the caprylic/capric triglycerides are preferably used in the amounts outlines above.

Another preferred skin care composition of the invention comprises the following:

(a) glucose as a carbon source,
(b) alanine a as a nitrogen source, and
(c) as an optional component, caprylic/capric triglycerides as a lipid source.

The glucose is preferably present in the composition in an amount as outlined above. The alanine is preferably present in the composition in an amount of 0.05 to 5.0% (w/w), more preferably 0.1 to 5.0% (w/w), more preferably 0.2 to 4.5% (w/w), more preferably 0.3 to 4.0% (w/w), more preferably 0.4 to 3.5% (w/w), more preferably 0.5 to 3.0% (w/w), more preferably 0.6 to 2.5% (w/w), more preferably 0.8 to 2.0% (w/w), more preferably 0.9 to 1.5% (w/w), such as 1.0% (w/w). In some embodiments, the amount of alanine present in the composition is at least 0.3 (w/w), at least 0.4 (w/w), at least 0.5 (w/w), at least 0.6 (w/w), at least 0.7 (w/w), at least 0.8 (w/w), at least 0.9 (w/w), at least 1.0 (w/w), at least 2.0 (w/w), or at least 3.0 (w/w). This composition may optionally include caprylic/capric triglycerides as a lipid source. If present, the caprylic/capric triglycerides are preferably used in the amounts outlines above.

Another preferred skin care composition of the invention comprises the following:
(a) fructose as a carbon source,
(b) urea as a nitrogen source, and
(c) as an optional component, caprylic/capric triglycerides as a lipid source.

It is preferred that the fructose is present in the composition in an amount of 0.05 to 5.0% (w/w), more preferably 0.1 to 5.0% (w/w), more preferably 0.2 to 4.5% (w/w), more preferably 0.3 to 4.0% (w/w), more preferably 0.4 to 3.5% (w/w), more preferably 0.5 to 3.0% (w/w), more preferably 0.6 to 2.5% (w/w), more preferably 0.7 to 2.0% (w/w), more preferably 0.8 to 1.5% (w/w), such as 1.0% (w/w). An amount of 0.05 to 1.0% (w/w) is particularly preferred. In some embodiments, the amount of fructose present in the composition is at least 0.3 (w/w), at least 0.4 (w/w), at least 0.5 (w/w), at least 0.6 (w/w), at least 0.7 (w/w), at least 0.8 (w/w), at least 0.9 (w/w), at least 1.0 (w/w), at least 2.0 (w/w), or at least 3.0 (w/w).

Similarly, it is preferred that the urea is present in the composition in an amount of 0.05 to 5.0% (w/w), more preferably 0.1 to 5.0% (w/w), more preferably 0.2 to 4.5% (w/w), more preferably 0.3 to 4.0% (w/w), more preferably 0.4 to 3.5% (w/w), more preferably 0.5 to 3.0% (w/w), more preferably 0.6 to 2.5% (w/w), more preferably 0.7 to 2.0% (w/w), more preferably 0.8 to 1.5% (w/w), such as 1.0% (w/w). In some embodiments, the amount of urea present in the composition is at least 0.3 (w/w), at least 0.4 (w/w), at least 0.5 (w/w), at least 0.6 (w/w), at least 0.7 (w/w), at least 0.8 (w/w), at least 0.9 (w/w), at least 1.0 (w/w), at least 2.0 (w/w), or at least 3.0 (w/w).

This composition may optionally include caprylic/capric triglycerides as a lipid source. The caprylic/capric triglycerides are preferably present in an amount of 0.1 to 6.0% (w/w), more preferably 0.2 to 6.0% (w/w), more preferably 0.3 to 5.5% (w/w), more preferably 0.4 to 5.0% (w/w), more preferably 0.5 to 4.5% (w/w), more preferably 0.6 to 4.0% (w/w), more preferably 0.7 to 3.5% (w/w), more preferably 0.8 to 3.0% (w/w), more preferably 0.9 to 2.5% (w/w), more preferably 1.0 to 3.0% (w/w), more preferably 1.5 to 2.5% (w/w), such as 2.0% (w/w). In some embodiments, the amount of caprylic/capric triglycerides present in the composition is at least 0.3 (w/w), at least 0.4 (w/w), at least 0.5 (w/w), at least 0.6 (w/w), at least 0.7 (w/w), at least 0.8 (w/w), at least 0.9 (w/w), at least 1.0 (w/w), at least 2.0 (w/w), at least 3.0 (w/w), at least 4.0 (w/w), or at least 5.0 (w/w).

Another preferred skin care composition of the invention comprises the following:
(a) fructose as a carbon source,
(b) arginine a as a nitrogen source, and
(c) as an optional component, caprylic/capric triglycerides as a lipid source.

The fructose is preferably present in the composition in an amount as outlined above. The arginine is preferably present in the composition in an amount of 0.05 to 5.0% (w/w), more preferably 0.1 to 5.0% (w/w), more preferably 0.2 to 4.5% (w/w), more preferably 0.3 to 4.0% (w/w), more preferably 0.4 to 3.5% (w/w), more preferably 0.5 to 3.0% (w/w), more preferably 0.6 to 2.5% (w/w), more preferably 0.8 to 2.0% (w/w), more preferably 0.9 to 1.5% (w/w), such as 1.0% (w/w). In some embodiments, the amount of arginine present in the composition is at least 0.3 (w/w), at least 0.4 (w/w), at least 0.5 (w/w), at least 0.6 (w/w), at least 0.7 (w/w), at least 0.8 (w/w), at least 0.9 (w/w), at least 1.0 (w/w), at least 2.0 (w/w), or at least 3.0 (w/w). This composition may optionally include caprylic/capric triglycerides as a lipid source. If present, the caprylic/capric triglycerides are preferably used in the amounts outlines above.

Another preferred skin care composition of the invention comprises the following:
(a) fructose as a carbon source,
(b) glycine a as a nitrogen source, and
(c) as an optional component, caprylic/capric triglycerides as a lipid source.

The fructose is preferably present in the composition in an amount as outlined above. The glycine is preferably present in the composition in an amount of 0.05 to 5.0% (w/w), more preferably 0.1 to 5.0% (w/w), more preferably 0.2 to 4.5% (w/w), more preferably 0.3 to 4.0% (w/w), more preferably 0.4 to 3.5% (w/w), more preferably 0.5 to 3.0% (w/w), more preferably 0.6 to 2.5% (w/w), more preferably 0.8 to 2.0% (w/w), more preferably 0.9 to 1.5% (w/w), such as 1.0% (w/w). In some embodiments, the amount of glycine present in the composition is at least 0.3 (w/w), at least 0.4 (w/w), at least 0.5 (w/w), at least 0.6 (w/w), at least 0.7 (w/w), at least 0.8 (w/w), at least 0.9 (w/w), at least 1.0 (w/w), at least 2.0 (w/w), or at least 3.0 (w/w). This composition may optionally include caprylic/capric triglycerides as a lipid source. If present, the caprylic/capric triglycerides are preferably used in the amounts outlines above.

Another preferred skin care composition of the invention comprises the following:
(a) fructose as a carbon source,
(b) alanine a as a nitrogen source, and
(c) as an optional component, caprylic/capric triglycerides as a lipid source.

The fructose is preferably present in the composition in an amount as outlined above. The alanine is preferably present in the composition in an amount of 0.05 to 5.0% (w/w), more preferably 0.1 to 5.0% (w/w), more preferably 0.2 to 4.5% (w/w), more preferably 0.3 to 4.0% (w/w), more preferably 0.4 to 3.5% (w/w), more preferably 0.5 to 3.0% (w/w), more preferably 0.6 to 2.5% (w/w), more preferably 0.8 to 2.0% (w/w), more preferably 0.9 to 1.5% (w/w), such as 1.0% (w/w). In some embodiments, the amount of alanine present in the composition is at least 0.3 (w/w), at least 0.4 (w/w), at least 0.5 (w/w), at least 0.6 (w/w), at least 0.7 (w/w), at least 0.8 (w/w), at least 0.9 (w/w), at least 1.0 (w/w), at least 2.0 (w/w), or at least 3.0 (w/w). This composition may optionally include caprylic/capric triglycerides as a lipid source. If present, the caprylic/capric triglycerides are preferably used in the amounts outlines above.

Another preferred skin care composition of the invention comprises the following:
(a) maltose as a carbon source,
(b) urea as a nitrogen source, and
(c) as an optional component, caprylic/capric triglycerides as a lipid source.

It is preferred that the maltose is present in the composition in an amount of 0.05 to 5.0% (w/w), more preferably 0.1 to 5.0% (w/w), more preferably 0.2 to 4.5% (w/w), more preferably 0.3 to 4.0% (w/w), more preferably 0.4 to 3.5% (w/w), more preferably 0.5 to 3.0% (w/w), more preferably 0.6 to 2.5% (w/w), more preferably 0.7 to 2.0% (w/w), more preferably 0.8 to 1.5% (w/w), such as 1.0% (w/w). An amount of 0.05 to 1.0% (w/w) is particularly preferred. In some embodiments, the amount of maltose present in the composition is at least 0.3 (w/w), at least 0.4 (w/w), at least 0.5 (w/w), at least 0.6 (w/w), at least 0.7 (w/w), at least 0.8 (w/w), at least 0.9 (w/w), at least 1.0 (w/w), at least 2.0 (w/w), or at least 3.0 (w/w).

Similarly, it is preferred that the urea is present in the composition in an amount of 0.05 to 5.0% (w/w), more preferably 0.1 to 5.0% (w/w), more preferably 0.2 to 4.5% (w/w), more preferably 0.3 to 4.0% (w/w), more preferably 0.4 to 3.5% (w/w), more preferably 0.5 to 3.0% (w/w), more preferably 0.6 to 2.5% (w/w), more preferably 0.7 to 2.0% (w/w), more preferably 0.8 to 1.5% (w/w), such as 1.0% (w/w). In some embodiments, the amount of urea present in the composition is at least 0.3 (w/w), at least 0.4 (w/w), at least 0.5 (w/w), at least 0.6 (w/w), at least 0.7 (w/w), at least 0.8 (w/w), at least 0.9 (w/w), at least 1.0 (w/w), at least 2.0 (w/w), or at least 3.0 (w/w).

This composition may optionally include caprylic/capric triglycerides as a lipid source. The caprylic/capric triglycerides are preferably present in an amount of 0.1 to 6.0% (w/w), more preferably 0.2 to 6.0% (w/w), more preferably 0.3 to 5.5% (w/w), more preferably 0.4 to 5.0% (w/w), more preferably 0.5 to 4.5% (w/w), more preferably 0.6 to 4.0% (w/w), more preferably 0.7 to 3.5% (w/w), more preferably 0.8 to 3.0% (w/w), more preferably 0.9 to 2.5% (w/w), more preferably 1.0 to 3.0% (w/w), more preferably 1.5 to 2.5% (w/w), such as 2.0% (w/w). In some embodiments, the amount of caprylic/capric triglycerides present in the composition is at least 0.3 (w/w), at least 0.4 (w/w), at least 0.5 (w/w), at least 0.6 (w/w), at least 0.7 (w/w), at least 0.8 (w/w), at least 0.9 (w/w), at least 1.0 (w/w), at least 2.0 (w/w), at least 3.0 (w/w), at least 4.0 (w/w), or at least 5.0 (w/w).

Another preferred skin care composition of the invention comprises the following:
(a) maltose as a carbon source,
(b) arginine a as a nitrogen source, and
(c) as an optional component, caprylic/capric triglycerides as a lipid source.

The maltose is preferably present in the composition in an amount as outlined above. The arginine is preferably present in the composition in an amount of 0.05 to 5.0% (w/w), more preferably 0.1 to 5.0% (w/w), more preferably 0.2 to 4.5% (w/w), more preferably 0.3 to 4.0% (w/w), more preferably 0.4 to 3.5% (w/w), more preferably 0.5 to 3.0% (w/w), more preferably 0.6 to 2.5% (w/w), more preferably 0.8 to 2.0% (w/w), more preferably 0.9 to 1.5% (w/w), such as 1.0% (w/w). In some embodiments, the amount of arginine present in the composition is at least 0.3 (w/w), at least 0.4 (w/w), at least 0.5 (w/w), at least 0.6 (w/w), at least 0.7 (w/w), at least 0.8 (w/w), at least 0.9 (w/w), at least 1.0 (w/w), at least 2.0 (w/w), or at least 3.0 (w/w). This composition may optionally include caprylic/capric triglycerides as a lipid source. If present, the caprylic/capric triglycerides are preferably used in the amounts outlines above.

Another preferred skin care composition of the invention comprises the following:
(a) maltose as a carbon source,
(b) glycine a as a nitrogen source, and
(c) as an optional component, caprylic/capric triglycerides as a lipid source.

The maltose is preferably present in the composition in an amount as outlined above. The glycine is preferably present in the composition in an amount of 0.05 to 5.0% (w/w), more preferably 0.1 to 5.0% (w/w), more preferably 0.2 to 4.5% (w/w), more preferably 0.3 to 4.0% (w/w), more preferably 0.4 to 3.5% (w/w), more preferably 0.5 to 3.0% (w/w), more preferably 0.6 to 2.5% (w/w), more preferably 0.8 to 2.0% (w/w), more preferably 0.9 to 1.5% (w/w), such as 1.0% (w/w). In some embodiments, the amount of glycine present in the composition is at least 0.3 (w/w), at least 0.4 (w/w), at least 0.5 (w/w), at least 0.6 (w/w), at least 0.7 (w/w), at least 0.8 (w/w), at least 0.9 (w/w), at least 1.0 (w/w), at least 2.0 (w/w), or at least 3.0 (w/w). This composition may optionally include caprylic/capric triglycerides as a lipid source. If present, the caprylic/capric triglycerides are preferably used in the amounts outlines above.

Another preferred skin care composition of the invention comprises the following:
(a) maltose as a carbon source,
(b) alanine a as a nitrogen source, and
(c) as an optional component, caprylic/capric triglycerides as a lipid source.

The maltose is preferably present in the composition in an amount as outlined above. The alanine is preferably present in the composition in an amount of 0.05 to 5.0% (w/w), more preferably 0.1 to 5.0% (w/w), more preferably 0.2 to 4.5% (w/w), more preferably 0.3 to 4.0% (w/w), more preferably 0.4 to 3.5% (w/w), more preferably 0.5 to 3.0% (w/w), more preferably 0.6 to 2.5% (w/w), more preferably 0.8 to 2.0% (w/w), more preferably 0.9 to 1.5% (w/w), such as 1.0% (w/w). In some embodiments, the amount of alanine present in the composition is at least 0.3 (w/w), at least 0.4 (w/w), at least 0.5 (w/w), at least 0.6 (w/w), at least 0.7 (w/w), at least 0.8 (w/w), at least 0.9 (w/w), at least 1.0 (w/w), at least 2.0 (w/w), or at least 3.0 (w/w). This composition may optionally include caprylic/capric triglycerides as a lipid source. If present, the caprylic/capric triglycerides are preferably used in the amounts outlines above.

Another preferred skin care composition of the invention comprises the following:
(a) saccharose as a carbon source,
(b) urea as a nitrogen source, and
(c) as an optional component, caprylic/capric triglycerides as a lipid source.

It is preferred that the saccharose is present in the composition in an amount of 0.05 to 5.0% (w/w), more preferably 0.1 to 5.0% (w/w), more preferably 0.2 to 4.5% (w/w), more preferably 0.3 to 4.0% (w/w), more preferably 0.4 to 3.5% (w/w), more preferably 0.5 to 3.0% (w/w), more preferably 0.6 to 2.5% (w/w), more preferably 0.7 to 2.0% (w/w), more preferably 0.8 to 1.5% (w/w), such as 1.0% (w/w). An amount of 0.05 to 1.0% (w/w) is particularly preferred. In some embodiments, the amount of saccharose present in the composition is at least 0.3 (w/w), at least 0.4 (w/w), at least 0.5 (w/w), at least 0.6 (w/w), at least 0.7 (w/w), at least 0.8 (w/w), at least 0.9 (w/w), at least 1.0 (w/w), at least 2.0 (w/w), or at least 3.0 (w/w).

Similarly, it is preferred that the urea is present in the composition in an amount of 0.05 to 5.0% (w/w), more preferably 0.1 to 5.0% (w/w), more preferably 0.2 to 4.5% (w/w), more preferably 0.3 to 4.0% (w/w), more preferably 0.4 to 3.5% (w/w), more preferably 0.5 to 3.0% (w/w), more preferably 0.6 to 2.5% (w/w), more preferably 0.7 to 2.0% (w/w), more preferably 0.8 to 1.5% (w/w), such as 1.0% (w/w). In some embodiments, the amount of urea present in the composition is at least 0.3 (w/w), at least 0.4 (w/w), at least 0.5 (w/w), at least 0.6 (w/w), at least 0.7 (w/w), at least 0.8 (w/w), at least 0.9 (w/w), at least 1.0 (w/w), at least 2.0 (w/w), or at least 3.0 (w/w).

This composition may optionally include caprylic/capric triglycerides as a lipid source. The caprylic/capric triglycerides are preferably present in an amount of 0.1 to 6.0% (w/w), more preferably 0.2 to 6.0% (w/w), more preferably 0.3 to 5.5% (w/w), more preferably 0.4 to 5.0% (w/w), more preferably 0.5 to 4.5% (w/w), more preferably 0.6 to 4.0% (w/w), more preferably 0.7 to 3.5% (w/w), more preferably 0.8 to 3.0% (w/w), more preferably 0.9 to 2.5% (w/w), more preferably 1.0 to 3.0% (w/w), more preferably 1.5 to 2.5% (w/w), such as 2.0% (w/w). In some embodiments, the amount of caprylic/capric triglycerides present in the composition is at least 0.3 (w/w), at least 0.4 (w/w), at least 0.5 (w/w), at least 0.6 (w/w), at least 0.7 (w/w), at least 0.8 (w/w), at least 0.9 (w/w), at least 1.0 (w/w), at least 2.0 (w/w), at least 3.0 (w/w), at least 4.0 (w/w), or at least 5.0 (w/w).

Another preferred skin care composition of the invention comprises the following:
  (a) saccharose as a carbon source,
  (b) arginine a as a nitrogen source, and
  (c) as an optional component, caprylic/capric triglycerides as a lipid source.

The saccharose is preferably present in the composition in an amount as outlined above. The arginine is preferably present in the composition in an amount of 0.05 to 5.0% (w/w), more preferably 0.1 to 5.0% (w/w), more preferably 0.2 to 4.5% (w/w), more preferably 0.3 to 4.0% (w/w), more preferably 0.4 to 3.5% (w/w), more preferably 0.5 to 3.0% (w/w), more preferably 0.6 to 2.5% (w/w), more preferably 0.8 to 2.0% (w/w), more preferably 0.9 to 1.5% (w/w), such as 1.0% (w/w). In some embodiments, the amount of arginine present in the composition is at least 0.3 (w/w), at least 0.4 (w/w), at least 0.5 (w/w), at least 0.6 (w/w), at least 0.7 (w/w), at least 0.8 (w/w), at least 0.9 (w/w), at least 1.0 (w/w), at least 2.0 (w/w), or at least 3.0 (w/w). This composition may optionally include caprylic/capric triglycerides as a lipid source. If present, the caprylic/capric triglycerides are preferably used in the amounts outlines above.

Another preferred skin care composition of the invention comprises the following:
  (a) saccharose as a carbon source,
  (b) glycine a as a nitrogen source, and
  (c) as an optional component, caprylic/capric triglycerides as a lipid source.

The saccharose is preferably present in the composition in an amount as outlined above. The glycine is preferably present in the composition in an amount of 0.05 to 5.0% (w/w), more preferably 0.1 to 5.0% (w/w), more preferably 0.2 to 4.5% (w/w), more preferably 0.3 to 4.0% (w/w), more preferably 0.4 to 3.5% (w/w), more preferably 0.5 to 3.0% (w/w), more preferably 0.6 to 2.5% (w/w), more preferably 0.8 to 2.0% (w/w), more preferably 0.9 to 1.5% (w/w), such as 1.0% (w/w). In some embodiments, the amount of glycine present in the composition is at least 0.3 (w/w), at least 0.4 (w/w), at least 0.5 (w/w), at least 0.6 (w/w), at least 0.7 (w/w), at least 0.8 (w/w), at least 0.9 (w/w), at least 1.0 (w/w), at least 2.0 (w/w), or at least 3.0 (w/w). This composition may optionally include caprylic/capric triglycerides as a lipid source. If present, the caprylic/capric triglycerides are preferably used in the amounts outlines above.

Another preferred skin care composition of the invention comprises the following:
  (a) saccharose as a carbon source,
  (b) alanine a as a nitrogen source, and
  (c) as an optional component, caprylic/capric triglycerides as a lipid source.

The saccharose is preferably present in the composition in an amount as outlined above. The alanine is preferably present in the composition in an amount of 0.05 to 5.0% (w/w), more preferably 0.1 to 5.0% (w/w), more preferably 0.2 to 4.5% (w/w), more preferably 0.3 to 4.0% (w/w), more preferably 0.4 to 3.5% (w/w), more preferably 0.5 to 3.0% (w/w), more preferably 0.6 to 2.5% (w/w), more preferably 0.8 to 2.0% (w/w), more preferably 0.9 to 1.5% (w/w), such as 1.0% (w/w). In some embodiments, the amount of alanine present in the composition is at least 0.3 (w/w), at least 0.4 (w/w), at least 0.5 (w/w), at least 0.6 (w/w), at least 0.7 (w/w), at least 0.8 (w/w), at least 0.9 (w/w), at least 1.0 (w/w), at least 2.0 (w/w), or at least 3.0 (w/w). This composition may optionally include caprylic/capric triglycerides as a lipid source. If present, the caprylic/capric triglycerides are preferably used in the amounts outlines above.

Another preferred skin care composition of the invention comprises the following:
  (a) maltodextrin as a carbon source,
  (b) urea as a nitrogen source, and
  (c) as an optional component, caprylic/capric triglycerides as a lipid source.

It is preferred that the maltodextrin is present in the composition in an amount of 0.05 to 5.0% (w/w), more preferably 0.1 to 5.0% (w/w), more preferably 0.2 to 4.5% (w/w), more preferably 0.3 to 4.0% (w/w), more preferably 0.4 to 3.5% (w/w), more preferably 0.5 to 3.0% (w/w), more preferably 0.6 to 2.5% (w/w), more preferably 0.7 to 2.0% (w/w), more preferably 0.8 to 1.5% (w/w), such as 1.0% (w/w). An amount of 0.05 to 1.0% (w/w) is particularly preferred. In some embodiments, the amount of maltodextrin present in the composition is at least 0.3 (w/w), at least 0.4 (w/w), at least 0.5 (w/w), at least 0.6 (w/w), at least 0.7 (w/w), at least 0.8 (w/w), at least 0.9 (w/w), at least 1.0 (w/w), at least 2.0 (w/w), or at least 3.0 (w/w).

Similarly, it is preferred that the urea is present in the composition in an amount of 0.05 to 5.0% (w/w), more preferably 0.1 to 5.0% (w/w), more preferably 0.2 to 4.5% (w/w), more preferably 0.3 to 4.0% (w/w), more preferably 0.4 to 3.5% (w/w), more preferably 0.5 to 3.0% (w/w), more preferably 0.6 to 2.5% (w/w), more preferably 0.7 to 2.0% (w/w), more preferably 0.8 to 1.5% (w/w), such as 1.0% (w/w). In some embodiments, the amount of urea present in the composition is at least 0.3 (w/w), at least 0.4 (w/w), at least 0.5 (w/w), at least 0.6 (w/w), at least 0.7 (w/w), at least 0.8 (w/w), at least 0.9 (w/w), at least 1.0 (w/w), at least 2.0 (w/w), or at least 3.0 (w/w).

This composition may optionally include caprylic/capric triglycerides as a lipid source. The caprylic/capric triglycerides are preferably present in an amount of 0.1 to 6.0% (w/w), more preferably 0.2 to 6.0% (w/w), more preferably 0.3 to 5.5% (w/w), more preferably 0.4 to 5.0% (w/w), more preferably 0.5 to 4.5% (w/w), more preferably 0.6 to 4.0%

(w/w), more preferably 0.7 to 3.5% (w/w), more preferably 0.8 to 3.0% (w/w), more preferably 0.9 to 2.5% (w/w), more preferably 1.0 to 3.0% (w/w), more preferably 1.5 to 2.5% (w/w), such as 2.0% (w/w). In some embodiments, the amount of caprylic/capric triglycerides present in the composition is at least 0.3 (w/w), at least 0.4 (w/w), at least 0.5 (w/w), at least 0.6 (w/w), at least 0.7 (w/w), at least 0.8 (w/w), at least 0.9 (w/w), at least 1.0 (w/w), at least 2.0 (w/w), at least 3.0 (w/w), at least 4.0 (w/w), or at least 5.0 (w/w).

Another preferred skin care composition of the invention comprises the following:
(a) maltodextrin as a carbon source,
(b) arginine a as a nitrogen source, and
(c) as an optional component, caprylic/capric triglycerides as a lipid source.

The maltodextrin is preferably present in the composition in an amount as outlined above. The arginine is preferably present in the composition in an amount of 0.05 to 5.0% (w/w), more preferably 0.1 to 5.0% (w/w), more preferably 0.2 to 4.5% (w/w), more preferably 0.3 to 4.0% (w/w), more preferably 0.4 to 3.5% (w/w), more preferably 0.5 to 3.0% (w/w), more preferably 0.6 to 2.5% (w/w), more preferably 0.8 to 2.0% (w/w), more preferably 0.9 to 1.5% (w/w), such as 1.0% (w/w). In some embodiments, the amount of arginine present in the composition is at least 0.3 (w/w), at least 0.4 (w/w), at least 0.5 (w/w), at least 0.6 (w/w), at least 0.7 (w/w), at least 0.8 (w/w), at least 0.9 (w/w), at least 1.0 (w/w), at least 2.0 (w/w), or at least 3.0 (w/w). This composition may optionally include caprylic/capric triglycerides as a lipid source. If present, the caprylic/capric triglycerides are preferably used in the amounts outlines above.

Another preferred skin care composition of the invention comprises the following:
(a) maltodextrin as a carbon source,
(b) glycine a as a nitrogen source, and
(c) as an optional component, caprylic/capric triglycerides as a lipid source.

The maltodextrin is preferably present in the composition in an amount as outlined above. The glycine is preferably present in the composition in an amount of 0.05 to 5.0% (w/w), more preferably 0.1 to 5.0% (w/w), more preferably 0.2 to 4.5% (w/w), more preferably 0.3 to 4.0% (w/w), more preferably 0.4 to 3.5% (w/w), more preferably 0.5 to 3.0% (w/w), more preferably 0.6 to 2.5% (w/w), more preferably 0.8 to 2.0% (w/w), more preferably 0.9 to 1.5% (w/w), such as 1.0% (w/w). In some embodiments, the amount of glycine present in the composition is at least 0.3 (w/w), at least 0.4 (w/w), at least 0.5 (w/w), at least 0.6 (w/w), at least 0.7 (w/w), at least 0.8 (w/w), at least 0.9 (w/w), at least 1.0 (w/w), at least 2.0 (w/w), or at least 3.0 (w/w). This composition may optionally include caprylic/capric triglycerides as a lipid source. If present, the caprylic/capric triglycerides are preferably used in the amounts outlines above.

Another preferred skin care composition of the invention comprises the following:
(a) maltodextrin as a carbon source,
(b) alanine a as a nitrogen source, and
(c) as an optional component, caprylic/capric triglycerides as a lipid source.

The maltodextrin is preferably present in the composition in an amount as outlined above. The alanine is preferably present in the composition in an amount of 0.05 to 5.0% (w/w), more preferably 0.1 to 5.0% (w/w), more preferably 0.2 to 4.5% (w/w), more preferably 0.3 to 4.0% (w/w), more preferably 0.4 to 3.5% (w/w), more preferably 0.5 to 3.0% (w/w), more preferably 0.6 to 2.5% (w/w), more preferably 0.8 to 2.0% (w/w), more preferably 0.9 to 1.5% (w/w), such as 1.0% (w/w). In some embodiments, the amount of alanine present in the composition is at least 0.3 (w/w), at least 0.4 (w/w), at least 0.5 (w/w), at least 0.6 (w/w), at least 0.7 (w/w), at least 0.8 (w/w), at least 0.9 (w/w), at least 1.0 (w/w), at least 2.0 (w/w), or at least 3.0 (w/w). This composition may optionally include caprylic/capric triglycerides as a lipid source. If present, the caprylic/capric triglycerides are preferably used in the amounts outlines above.

Particularly preferred compositions of the invention include, but are not limited to:

A skin care composition comprising:
(a) 0.05 to 5.0% (w/w) pyruvic acid, pyruvate or a mixture thereof as a carbon source,
(b) 0.05 to 5.0% (w/w) urea or alanine as a nitrogen source, and
(c) as an optional component, 0.05 to 6.0% (w/w) caprylic/capric triglycerides as a lipid source.

A skin care composition comprising:
(a) 0.05 to 5.0% (w/w) pyruvic acid, pyruvate or a mixture thereof as a carbon source,
(b) 0.05 to 5.0% (w/w) arginine or glycine as a nitrogen source, and
(c) as an optional component, 0.05 to 6.0% (w/w) caprylic/capric triglycerides as a lipid source.

A skin care composition comprising:
(a) 0.5 to 3.0% (w/w) pyruvic acid, pyruvate or a mixture thereof as a carbon source,
(b) 0.5 to 3.0% (w/w) urea or alanine as a nitrogen source, and
(c) as an optional component, 0.5 to 4.5% (w/w) caprylic/capric triglycerides as a lipid source.

A skin care composition comprising:
(a) 0.5 to 3.0% (w/w) pyruvic acid, pyruvate or a mixture thereof as a carbon source,
(b) 0.5 to 3.0% (w/w) arginine or glycine as a nitrogen source, and
(c) as an optional component, 0.5 to 4.5% (w/w) caprylic/capric triglycerides as a lipid source.

A skin care composition comprising:
(a) 1.0 to 1.5% (w/w) pyruvic acid, pyruvate or a mixture thereof as a carbon source,
(b) 1.0 to 1.5% (w/w) urea or alanine as a nitrogen source, and
(c) as an optional component, 1.5 to 2.5% (w/w) caprylic/capric triglycerides as a lipid source.

A skin care composition comprising:
(a) 1.0 to 1.5% (w/w) pyruvic acid, pyruvate or a mixture thereof as a carbon source,
(b) 1.0 to 1.5% (w/w) arginine or glycine as a nitrogen source, and
(c) as an optional component, 1.5 to 2.5% (w/w) caprylic/capric triglycerides as a lipid source.

A skin care composition comprising:
(a) 0.05 to 5.0% (w/w) lactic acid, lactate or a mixture thereof as a carbon source,
(b) 0.05 to 5.0% (w/w) urea or alanine as a nitrogen source, and
(c) as an optional component, 0.2 to 6.0% (w/w) caprylic/capric triglycerides as a lipid source.

A skin care composition comprising:
(a) 0.05 to 5.0% (w/w) lactic acid, lactate or a mixture thereof as a carbon source, (b) 0.05 to 5.0% (w/w) arginine or glycine as a nitrogen source, and
(c) as an optional component, 0.2 to 6.0% (w/w) caprylic/capric triglycerides as a lipid source.

A skin care composition comprising:
(a) 0.5 to 3.0% (w/w) lactic acid, lactate or a mixture thereof as a carbon source,
(b) 0.5 to 3.0% (w/w) urea or alanine as a nitrogen source, and
(c) as an optional component, 0.5 to 4.5% (w/w) caprylic/capric triglycerides as a lipid source.

A skin care composition comprising:
(a) 0.5 to 3.0% (w/w) lactic acid, lactate or a mixture thereof as a carbon source,
(b) 0.5 to 3.0% (w/w) arginine or glycine as a nitrogen source, and
(c) as an optional component, 0.5 to 4.5% (w/w) caprylic/capric triglycerides as a lipid source.

A skin care composition comprising:
(a) 1.0 to 1.5% (w/w) lactic acid, lactate or a mixture thereof as a carbon source,
(b) 1.0 to 1.5% (w/w) urea or alanine as a nitrogen source, and
(c) as an optional component, 1.5 to 2.5% (w/w) caprylic/capric triglycerides as a lipid source.

A skin care composition comprising:
(a) 1.0 to 1.5% (w/w) lactic acid, lactate or a mixture thereof as a carbon source,
(b) 1.0 to 1.5% (w/w) arginine or glycine as a nitrogen source, and
(c) as an optional component, 1.5 to 2.5% (w/w) caprylic/capric triglycerides as a lipid source.

A skin care composition comprising:
(a) 0.05 to 5.0% (w/w) glucose as a carbon source,
(b) 0.05 to 5.0% (w/w) urea or alanine as a nitrogen source, and
(c) as an optional component, 0.05 to 6.0% (w/w) caprylic/capric triglycerides as a lipid source.

A skin care composition comprising:
(a) 0.05 to 5.0% (w/w) glucose as a carbon source,
(b) 0.05 to 5.0% (w/w) arginine or glycine as a nitrogen source, and
(c) as an optional component, 0.05 to 6.0% (w/w) caprylic/capric triglycerides as a lipid source.

A skin care composition comprising:
(a) 0.5 to 3.0% (w/w) glucose as a carbon source,
(b) 0.5 to 3.0% (w/w) urea or alanine as a nitrogen source, and
(c) as an optional component, 0.5 to 4.5% (w/w) caprylic/capric triglycerides as a lipid source.

A skin care composition comprising:
(a) 0.5 to 3.0% (w/w) glucose as a carbon source,
(b) 0.5 to 3.0% (w/w) arginine or glycine as a nitrogen source, and
(c) as an optional component, 0.5 to 4.5% (w/w) caprylic/capric triglycerides as a lipid source.

A skin care composition comprising:
(a) 1.0 to 1.5% (w/w) glucose as a carbon source,
(b) 1.0 to 1.5% (w/w) urea or alanine as a nitrogen source, and
(c) as an optional component, 1.5 to 2.5% (w/w) caprylic/capric triglycerides as a lipid source.

A skin care composition comprising:
(a) 1.0 to 1.5% (w/w) glucose as a carbon source,
(b) 1.0 to 1.5% (w/w) arginine or glycine as a nitrogen source, and
(c) as an optional component, 1.5 to 2.5% (w/w) caprylic/capric triglycerides as a lipid source.

A skin care composition comprising:
(a) 0.05 to 5.0% (w/w) fructose as a carbon source,
(b) 0.05 to 5.0% (w/w) urea or alanine as a nitrogen source, and
(c) as an optional component, 0.2 to 6.0% (w/w) caprylic/capric triglycerides as a lipid source.

A skin care composition comprising:
(a) 0.05 to 5.0% (w/w) fructose as a carbon source,
(b) 0.05 to 5.0% (w/w) arginine or glycine as a nitrogen source, and
(c) as an optional component, 0.2 to 6.0% (w/w) caprylic/capric triglycerides as a lipid source.

A skin care composition comprising:
(a) 0.5 to 3.0% (w/w) fructose as a carbon source,
(b) 0.5 to 3.0% (w/w) urea or alanine as a nitrogen source, and
(c) as an optional component, 0.5 to 4.5% (w/w) caprylic/capric triglycerides as a lipid source.

A skin care composition comprising:
(a) 0.5 to 3.0% (w/w) fructose as a carbon source,
(b) 0.5 to 3.0% (w/w) arginine or glycine as a nitrogen source, and
(c) as an optional component, 0.5 to 4.5% (w/w) caprylic/capric triglycerides as a lipid source.

A skin care composition comprising:
(a) 1.0 to 1.5% (w/w) fructose as a carbon source,
(b) 1.0 to 1.5% (w/w) urea or alanine as a nitrogen source, and
(c) as an optional component, 1.5 to 2.5% (w/w) caprylic/capric triglycerides as a lipid source.

A skin care composition comprising:
(a) 1.0 to 1.5% (w/w) fructose as a carbon source,
(b) 1.0 to 1.5% (w/w) arginine or glycine as a nitrogen source, and
(c) as an optional component, 1.5 to 2.5% (w/w) caprylic/capric triglycerides as a lipid source.

A skin care composition comprising:
(a) 0.05 to 5.0% (w/w) maltose as a carbon source,
(b) 0.05 to 5.0% (w/w) urea or alanine as a nitrogen source, and
(c) as an optional component, 0.05 to 6.0% (w/w) caprylic/capric triglycerides as a lipid source.

A skin care composition comprising:
(a) 0.05 to 5.0% (w/w) maltose as a carbon source,
(b) 0.05 to 5.0% (w/w) arginine or glycine as a nitrogen source, and
(c) as an optional component, 0.05 to 6.0% (w/w) caprylic/capric triglycerides as a lipid source.

A skin care composition comprising:
(a) 0.5 to 3.0% (w/w) maltose as a carbon source,
(b) 0.5 to 3.0% (w/w) urea or alanine as a nitrogen source, and
(c) as an optional component, 0.5 to 4.5% (w/w) caprylic/capric triglycerides as a lipid source.

A skin care composition comprising:
(a) 0.5 to 3.0% (w/w) maltose as a carbon source,
(b) 0.5 to 3.0% (w/w) arginine or glycine as a nitrogen source, and
(c) as an optional component, 0.5 to 4.5% (w/w) caprylic/capric triglycerides as a lipid source.

A skin care composition comprising:
(a) 1.0 to 1.5% (w/w) maltose as a carbon source,
(b) 1.0 to 1.5% (w/w) urea or alanine as a nitrogen source, and (c) as an optional component, 1.5 to 2.5% (w/w) caprylic/capric triglycerides as a lipid source.

A skin care composition comprising:
(a) 1.0 to 1.5% (w/w) maltose as a carbon source,
(b) 1.0 to 1.5% (w/w) arginine or glycine as a nitrogen source, and
(c) as an optional component, 1.5 to 2.5% (w/w) caprylic/capric triglycerides as a lipid source.

A skin care composition comprising:
(a) 0.05 to 5.0% (w/w) saccharose as a carbon source,
(b) 0.05 to 5.0% (w/w) urea or alanine as a nitrogen source, and
(c) as an optional component, 0.2 to 6.0% (w/w) caprylic/capric triglycerides as a lipid source.

A skin care composition comprising:
(a) 0.05 to 5.0% (w/w) saccharose as a carbon source,
(b) 0.05 to 5.0% (w/w) arginine or glycine as a nitrogen source, and
(c) as an optional component, 0.2 to 6.0% (w/w) caprylic/capric triglycerides as a lipid source.

A skin care composition comprising:
(a) 0.5 to 3.0% (w/w) saccharose as a carbon source,
(b) 0.5 to 3.0% (w/w) urea or alanine as a nitrogen source, and
(c) as an optional component, 0.5 to 4.5% (w/w) caprylic/capric triglycerides as a lipid source.

A skin care composition comprising:
(a) 0.5 to 3.0% (w/w) saccharose as a carbon source,
(b) 0.5 to 3.0% (w/w) arginine or glycine as a nitrogen source, and
(c) as an optional component, 0.5 to 4.5% (w/w) caprylic/capric triglycerides as a lipid source.

A skin care composition comprising:
(a) 1.0 to 1.5% (w/w) saccharose as a carbon source,
(b) 1.0 to 1.5% (w/w) urea or alanine as a nitrogen source, and
(c) as an optional component, 1.5 to 2.5% (w/w) caprylic/capric triglycerides as a lipid source.

A skin care composition comprising:
(a) 1.0 to 1.5% (w/w) saccharose as a carbon source,
(b) 1.0 to 1.5% (w/w) arginine or glycine as a nitrogen source, and
(c) as an optional component, 1.5 to 2.5% (w/w) caprylic/capric triglycerides as a lipid source.

A skin care composition comprising:
(a) 0.05 to 5.0% (w/w) maltodextrin as a carbon source,
(b) 0.05 to 5.0% (w/w) urea or alanine as a nitrogen source, and
(c) as an optional component, 0.2 to 6.0% (w/w) caprylic/capric triglycerides as a lipid source.

A skin care composition comprising:
(a) 0.05 to 5.0% (w/w) maltodextrin as a carbon source,
(b) 0.05 to 5.0% (w/w) arginine or glycine as a nitrogen source, and
(c) as an optional component, 0.2 to 6.0% (w/w) caprylic/capric triglycerides as a lipid source.

A skin care composition comprising:
(a) 0.5 to 3.0% (w/w) maltodextrin as a carbon source,
(b) 0.5 to 3.0% (w/w) urea or alanine as a nitrogen source, and
(c) as an optional component, 0.5 to 4.5% (w/w) caprylic/capric triglycerides as a lipid source.

A skin care composition comprising:
(a) 0.5 to 3.0% (w/w) maltodextrin as a carbon source,
(b) 0.5 to 3.0% (w/w) arginine or glycine as a nitrogen source, and
(c) as an optional component, 0.5 to 4.5% (w/w) caprylic/capric triglycerides as a lipid source.

A skin care composition comprising:
(a) 1.0 to 1.5% (w/w) maltodextrin as a carbon source,
(b) 1.0 to 1.5% (w/w) urea or alanine as a nitrogen source, and
(c) as an optional component, 1.5 to 2.5% (w/w) caprylic/capric triglycerides as a lipid source.

A skin care composition comprising:
(a) 1.0 to 1.5% (w/w) maltodextrin as a carbon source,
(b) 1.0 to 1.5% (w/w) arginine or glycine as a nitrogen source, and
(c) as an optional component, 1.5 to 2.5% (w/w) caprylic/capric triglycerides as a lipid source.

A skin care composition comprising:
(a) 0.05 to 5.0% (w/w) pyruvic acid, pyruvate or a mixture thereof as a carbon source,
(b) 0.05 to 5.0% (w/w) urea as a nitrogen source, and
(c) as an optional component, 0.05 to 6.0% (w/w) caprylic/capric triglycerides as a lipid source.

A skin care composition comprising:
(a) 0.05 to 5.0% (w/w) pyruvic acid, pyruvate or a mixture thereof as a carbon source,
(b) 0.05 to 5.0% (w/w) arginine as a nitrogen source, and
(c) as an optional component, 0.05 to 6.0% (w/w) caprylic/capric triglycerides as a lipid source.

A skin care composition comprising:
(a) 0.5 to 3.0% (w/w) pyruvic acid, pyruvate or a mixture thereof as a carbon source,
(b) 0.5 to 3.0% (w/w) urea as a nitrogen source, and
(c) as an optional component, 0.5 to 4.5% (w/w) caprylic/capric triglycerides as a lipid source.

A skin care composition comprising:
(a) 0.5 to 3.0% (w/w) pyruvic acid, pyruvate or a mixture thereof as a carbon source,
(b) 0.5 to 3.0% (w/w) arginine as a nitrogen source, and
(c) as an optional component, 0.5 to 4.5% (w/w) caprylic/capric triglycerides as a lipid source.

A skin care composition comprising:
(a) 1.0 to 1.5% (w/w) pyruvic acid, pyruvate or a mixture thereof as a carbon source,
(b) 1.0 to 1.5% (w/w) urea as a nitrogen source, and
(c) as an optional component, 1.5 to 2.5% (w/w) caprylic/capric triglycerides as a lipid source.

A skin care composition comprising:
(a) 1.0 to 1.5% (w/w) pyruvic acid, pyruvate or a mixture thereof as a carbon source,
(b) 1.0 to 1.5% (w/w) arginine as a nitrogen source, and
(c) as an optional component, 1.5 to 2.5% (w/w) caprylic/capric triglycerides as a lipid source.

A skin care composition comprising:
(a) 0.1 to 5.0% (w/w) lactic acid, lactate or a mixture thereof as a carbon source,
(b) 0.1 to 5.0% (w/w) urea as a nitrogen source, and
(c) as an optional component, 0.2 to 6.0% (w/w) caprylic/capric triglycerides as a lipid source.

A skin care composition comprising:
(a) 0.1 to 5.0% (w/w) lactic acid, lactate or a mixture thereof as a carbon source,
(b) 0.1 to 5.0% (w/w) arginine as a nitrogen source, and
(c) as an optional component, 0.2 to 6.0% (w/w) caprylic/capric triglycerides as a lipid source.

A skin care composition comprising:
(a) 0.5 to 3.0% (w/w) lactic acid, lactate or a mixture thereof as a carbon source,
(b) 0.5 to 3.0% (w/w) urea as a nitrogen source, and (c) as an optional component, 0.5 to 4.5% (w/w) caprylic/capric triglycerides as a lipid source.

A skin care composition comprising:
(a) 0.5 to 3.0% (w/w) lactic acid, lactate or a mixture thereof as a carbon source,
(b) 0.5 to 3.0% (w/w) arginine as a nitrogen source, and
(c) as an optional component, 0.5 to 4.5% (w/w) caprylic/capric triglycerides as a lipid source.

A skin care composition comprising:
(a) 1.0 to 1.5% (w/w) lactic acid, lactate or a mixture thereof as a carbon source,
(b) 1.0 to 1.5% (w/w) urea as a nitrogen source, and
(c) as an optional component, 1.5 to 2.5% (w/w) caprylic/capric triglycerides as a lipid source.

A skin care composition comprising:
(a) 1.0 to 1.5% (w/w) lactic acid, lactate or a mixture thereof as a carbon source,
(b) 1.0 to 1.5% (w/w) arginine as a nitrogen source, and
(c) as an optional component, 1.5 to 2.5% (w/w) caprylic/capric triglycerides as a lipid source.

Instead of a single amino acid like arginine or alanine, also mixtures of amino acids can be used according to the present invention, For example, mixtures comprising one or more of alanine, arginine, serine, threonine, histidine, glutamic acid and/or lysine can be used. Mixtures of alanine and arginine are particularly preferred. Another nitrogen source that can be used in the compositions of the invention, either alone or in combination with another nitrogen source, is betaine (2-trimethylammonioacetate). The betaine is preferably present in the composition in an amount of 0.05 to 5.0% (w/w), more preferably 0.1 to 5.0% (w/w), more preferably 0.2 to 4.5% (w/w), more preferably 0.3 to 4.0% (w/w), more preferably 0.4 to 3.5% (w/w), more preferably 0.5 to 3.0% (w/w), more preferably 0.6 to 2.5% (w/w), more preferably 0.8 to 2.0% (w/w), more preferably 0.9 to 1.5% (w/w), such as 1.0% (w/w). In some embodiments, the amount of betaine present in the composition is at least 0.3 (w/w), at least 0.4 (w/w), at least 0.5 (w/w), at least 0.6 (w/w), at least 0.7 (w/w), at least 0.8 (w/w), at least 0.9 (w/w), at least 1.0 (w/w), at least 2.0 (w/w), or at least 3.0 (w/w).

In a preferred aspect of the invention, the skin care composition of the invention is formulated as a water-containing composition for topical application to the skin that has a particularly low osmolality. It has been found that it is possible to further support a healthy and stable microbiome by reducing osmolality. A high number of osmotically active solutes in the compositions leads to a high level of osmotic stress after application of the composition to the skin. After application to the skin, the water contained in the composition evaporates to a significant extent so that the remaining water on the skin surface comprises salts and other osmotically active components in highly concentrated form. These concentrated compounds are able to bind free water in the environment which is crucial for the bacterial metabolism and hence for viability of the bacteria. In addition, due to the hyperosmotic conditions on the skin surface, water from inside of the bacterial cells diffuses along the osmotic gradient to the outside. This severely impacts viability of the bacterial cells.

The osmolality of a solution quantifies the osmotically active particles or ions contained in a solution. In contrast to molarity, which determines the number of particles or ions in a volume of fluid, osmolality refers to the mass weight. It is normally expressed as mOsm/kg water or mmol/kg water. The actual osmolality of a composition can be determined in accordance with methods well-known in the art. For example, osmolality can be measured by using a freezing point depression osmometer or a vapour pressure depression osmometer. Since the freezing point of a water-based composition is depressed dependent on the number of osmotically active particles or ions contained, it is possible to measure osmolality by determining the freezing point of the composition.

Since measuring the actual osmolality is cumbersome, the osmolality of a composition is often determined in practice by calculation the "theoretical osmolality" based on the molar masses of the compounds contained in said composition and the amounts of the compounds in the composition. As used herein, the theoretical osmolality $b_{osm}$ indicates the molality of the osmotically active particles in a solution. It is calculated according to the formula:

$$b_{osm} = \frac{n_{osm}}{m_{Solvent}}$$

wherein $n_{osm}$ indicates the amount of osmotically active particles in moles and $m_{solvent}$ indicates the mass of the solvent in kg.

According to the invention, the skin care composition has a theoretical osmolality of 4000 mOsm/kg water or less. Preferably, the composition has a theoretical osmolality of 3900 mOsm/kg water or less, 3800 mOsm/kg water or less, 3700 mOsm/kg water or less, 3600 mOsm/kg water or less, 3500 mOsm/kg water or less, 3400 mOsm/kg water or less, 3300 mOsm/kg water or less, 3200 mOsm/kg water or less, 3100 mOsm/kg water or less, or 3000 mOsm/kg water or less. Stated differently, it is particularly preferred that skin care composition has a theoretical osmolality in the range between 3000-4000 mOsm/kg water, more preferably between 3100-3900 mOsm/kg water, between 3200-3800 mOsm/kg water, between 3300-3700 mOsm/kg water, or between 3400-3600 mOsm/kg water.

The composition of the invention preferably is a water-containing composition. The water content of the composition preferably is 30% (w/w) water or more. This means that the composition of the invention preferably comprises 30% (w/w) water or more, 35% (w/w) water or more, 40% (w/w) water or more, 45% (w/w) water or more, 50% (w/w) water or more, 55% (w/w) water or more, 60% (w/w) water or more, 65% (w/w) water or more, 70% (w/w) water or more, 75% (w/w) water or more, 80% (w/w) water or more, or 85% (w/w) water or more. It is particularly preferred that the composition of the invention comprises at least 70% (w/w) or at least 75% (w/w) water.

The skin care composition of the present invention is preferably formulated as a ready-to-use composition which is suitable for direct topical administration to the skin. Such a composition may be provided in different forms, including, but not limited to, in the form of a gel, lotion, fluid, cream, ointment, solution, a water-based emulsion, or the like. In a particularly preferred embodiment, the skin care composition of the present invention is formulated as a gel or lotion.

To provide for a low level of osmolality, the skin care compositions of the invention will use only reduced amounts of compounds which, upon their dissolution in water, are osmotically active. In some embodiments, certain osmotically active compounds like NaCl, KCl, $CaCl_2$ or $MgCl_2$ are completely omitted.

In one embodiment, the amount of NaCl in the composition which is to be administered to the skin is less than 1% (w/w), less than 0.9% (w/w), less than 0.8% (w/w), less than 0.7% (w/w), less than 0.6% (w/w), less than 0.5% (w/w), less than 0.4% (w/w), less than 0.3% (w/w), less than 0.2% (w/w), or less than 0.1% (w/w). In a particularly preferred embodiment, the composition does not comprise any NaCl.

In yet one embodiment, the amount of KCl in the composition which is to be administered to the skin is less than 1% (w/w), less than 0.9% (w/w), less than 0.8% (w/w), less than 0.7% (w/w), less than 0.6% (w/w), less than 0.5% (w/w), less than 0.4% (w/w), less than 0.3% (w/w), less than 0.2% (w/w), or less than 0.1% (w/w). In a particularly preferred embodiment, the composition does not comprise any KCl.

In one embodiment, the amount of $CaCl_2$ in the composition which is to be administered to the skin is less than 1% (w/w), less than 0.9% (w/w), less than 0.8% (w/w), less than 0.7% (w/w), less than 0.6% (w/w), less than 0.5% (w/w), less than 0.4% (w/w), less than 0.3% (w/w), less than 0.2% (w/w), or less than 0.1% (w/w). In a particularly preferred embodiment, the composition does not comprise any $CaCl_2$.

In one embodiment, the amount of $MgCl_2$ in the composition which is to be administered to the skin is less than 1% (w/w), less than 0.9% (w/w), less than 0.8% (w/w), less than 0.7% (w/w), less than 0.6% (w/w), less than 0.5% (w/w), less than 0.4% (w/w), less than 0.3% (w/w), less than 0.2% (w/w), or less than 0.1% (w/w). In a particularly preferred embodiment, the composition does not comprise any $MgCl_2$.

Another component that contributes to osmolality is glycerol. It is preferred according to the invention that the amount of glycerol in the composition which is to be administered to the skin is less than 10% (w/w), less than 9% (w/w), less than 8% (w/w), less than 7% (w/w), less than 6% (w/w), less than 5% (w/w), less than 4% (w/w), less than 3% (w/w), less than 2% (w/w), or less than 1% (w/w). In a particularly preferred embodiment, the composition does not comprise any glycerol.

In one embodiment, the skin care composition of the invention as defined elsewhere hereinabove comprises less than 0.5% (w/w) of NaCl and less than 5% (w/w) of glycerol. In one embodiment, the composition comprises less than 0.5% (w/w) of NaCl and no glycerol. In another embodiment, the composition comprises less than 5% (w/w) of glycerol and no NaCl.

In another embodiment, the skin care composition comprises less than 0.5% (w/w) of KCl and less than 5% (w/w) of glycerol. In one embodiment, the composition comprises less than 0.5% (w/w) of KCl and no glycerol. In another embodiment, the composition comprises less than 5% (w/w) of glycerol and no KCl.

In yet another embodiment, the skin care composition comprises less than 0.5% (w/w) of $CaCl_2$ and less than 5% (w/w) of glycerol. In one embodiment, the composition comprises less than 0.5% (w/w) of $CaCl_2$ and no glycerol. In another embodiment, the composition comprises less than 5% (w/w) of glycerol and no $CaCl_2$.

In yet another embodiment, the skin care composition comprises less than 0.5% (w/w) of $MgCl_2$ and less than 5% (w/w) of glycerol. In one embodiment, the composition comprises less than 0.5% (w/w) of $MgCl_2$ and no glycerol. In another embodiment, the composition comprises less than 5% (w/w) of glycerol and no $MgCl_2$.

A particularly preferred skin care composition of the invention therefore has an osmolality of 4000 mOsm/kg water or less and comprises (a) glucose, fructose, saccharose, maltose, maltodextrin, pyruvic acid, pyruvate, lactic acid, and/or lactate as a carbon source, preferably in an amount of 0.05 to 5.0% (w/w),
(b) at least 50% (w/w) water,
(c) less than 0.5% (w/w) of NaCl,
(d) less than 5% (w/w) of glycerol.

and at least one of the following:
(e) alanine, glycine, urea and/or arginine as a nitrogen source, preferably in an amount of 0.05 to 5.0% (w/w),
(f) caprylic/capric triglycerides as a lipid source preferably in an amount of 0.05 to 6.0% (w/w).

Another particularly preferred skin care composition of the invention therefore has an osmolality of 4000 mOsm/kg water or less and comprises (a) glucose, fructose, saccharose, maltose, maltodextrin, pyruvic acid, pyruvate, lactic acid and/or lactate as a carbon source, preferably in an amount of 0.05 to 5.0% (w/w),
(b) at least 50% (w/w) water,
(c) less than 0.5% (w/w) of KCl,
(d) less than 5% (w/w) of glycerol.

and at least one of the following:
(e) alanine, glycine, urea and/or arginine as a nitrogen source, preferably in an amount of 0.05 to 5.0% (w/w),
(f) caprylic/capric triglycerides as a lipid source preferably in an amount of 0.05 to 6.0% (w/w).

Another particularly preferred skin care composition of the invention therefore has an osmolality of 4000 mOsm/kg water or less and comprises (a) glucose, fructose, saccharose, maltose, maltodextrin, pyruvic acid, pyruvate, lactic acid and/or lactate as a carbon source, preferably in an amount of 0.05 to 5.0% (w/w),
(b) at least 50% (w/w) water,
(c) less than 0.5% (w/w) of $CaCl_2$,
(d) less than 5% (w/w) of glycerol.

and at least one of the following:
(e) alanine, glycine, urea and/or arginine as a nitrogen source, preferably in an amount of 0.05 to 5.0% (w/w),
(f) caprylic/capric triglycerides as a lipid source preferably in an amount of 0.05 to 6.0% (w/w).

Another particularly preferred skin care composition of the invention therefore has an osmolality of 4000 mOsm/kg water or less and comprises (a) glucose, fructose, saccharose, maltose, maltodextrin, pyruvic acid, pyruvate, lactic acid, and/or lactate as a carbon source, preferably in an amount of 0.05 to 5.0% (w/w),
(b) at least 50% (w/w) water,
(c) less than 0.5% (w/w) of $MgCl_2$,
(d) less than 5% (w/w) of glycerol.

and at least one of the following:
(e) alanine, glycine, urea and/or arginine as a nitrogen source, preferably in an amount of 0.05 to 5.0% (w/w),
(f) caprylic/capric triglycerides as a lipid source preferably in an amount of 0.05 to 6.0% (w/w).

A particularly preferred skin care composition of the invention therefore has an osmolality of 4000 mOsm/kg water or less and comprises (a) 0.05 to 5.0% (w/w) glucose, fructose, saccharose, maltose, maltodextrin, pyruvic acid, pyruvate, lactic acid and/or lactate as a carbon source,
(b) 0.05 to 5.0% (w/w) urea as a nitrogen source,
(c) at least 50% (w/w) water,
(d) less than 0.5% (w/w) of NaCl,
(e) less than 5% (w/w) of glycerol, and (f) as an optional component, 0.05 to 6.0% (w/w) caprylic/capric triglycerides as a lipid source.

A particularly preferred skin care composition of the invention therefore has an osmolality of 4000 mOsm/kg water or less and comprises
- (a) 0.05 to 5.0% (w/w) glucose, fructose, saccharose, maltose, maltodextrin, pyruvic acid, pyruvate, lactic acid and/or lactate as a carbon source,
- (b) 0.05 to 5.0% (w/w) arginine as a nitrogen source,
- (c) at least 50% (w/w) water,
- (d) less than 0.5% (w/w) of NaCl,
- (e) less than 5% (w/w) of glycerol, and
- (f) as an optional component, 0.05 to 6.0% (w/w) caprylic/capric triglycerides as a lipid source.

A particularly preferred skin care composition of the invention therefore has an osmolality of 4000 mOsm/kg water or less and comprises
- (a) 0.05 to 5.0% (w/w) glucose, fructose, saccharose, maltose, maltodextrin, pyruvic acid, pyruvate, lactic acid and/or lactate as a carbon source,
- (b) 0.05 to 5.0% (w/w) glycine as a nitrogen source,
- (c) at least 50% (w/w) water,
- (d) less than 0.5% (w/w) of NaCl,
- (e) less than 5% (w/w) of glycerol, and
- (f) as an optional component, 0.05 to 6.0% (w/w) caprylic/capric triglycerides as a lipid source.

A particularly preferred skin care composition of the invention therefore has an osmolality of 4000 mOsm/kg water or less and comprises
- (a) 0.05 to 5.0% (w/w) glucose, fructose, saccharose, maltose, maltodextrin, pyruvic acid, pyruvate, lactic acid and/or lactate as a carbon source,
- (b) 0.05 to 5.0% (w/w) alanine as a nitrogen source,
- (c) at least 50% (w/w) water,
- (d) less than 0.5% (w/w) of NaCl,
- (e) less than 5% (w/w) of glycerol, and
- (f) as an optional component, 0.05 to 6.0% (w/w) caprylic/capric triglycerides as a lipid source.

A particularly preferred skin care composition of the invention therefore has an osmolality of 4000 mOsm/kg water or less and comprises
- (a) 0.5 to 3.0% (w/w) glucose, fructose, saccharose, maltose, maltodextrin, pyruvic acid, pyruvate, lactic acid and/or lactate as a carbon source,
- (b) 0.5 to 3.0% (w/w) urea as a nitrogen source,
- (c) at least 50% (w/w) water,
- (d) less than 0.5% (w/w) of NaCl,
- (e) less than 5% (w/w) of glycerol, and
- (f) as an optional component, 0.5 to 4.5% (w/w) caprylic/capric triglycerides as a lipid source.

A particularly preferred skin care composition of the invention therefore has an osmolality of 4000 mOsm/kg water or less and comprises
- (a) 0.5 to 3.0% (w/w) glucose, fructose, saccharose, maltose, maltodextrin, pyruvic acid, pyruvate, lactic acid and/or lactate as a carbon source,
- (b) 0.5 to 3.0% (w/w) arginine as a nitrogen source,
- (c) at least 50% (w/w) water,
- (d) less than 0.5% (w/w) of NaCl,
- (e) less than 5% (w/w) of glycerol, and
- (f) as an optional component, 0.5 to 4.5% (w/w) caprylic/capric triglycerides as a lipid source.

A particularly preferred skin care composition of the invention therefore has an osmolality of 4000 mOsm/kg water or less and comprises
- (a) 0.5 to 3.0% (w/w) glucose, fructose, saccharose, maltose, maltodextrin, pyruvic acid, pyruvate, lactic acid and/or lactate as a carbon source,
- (b) 0.5 to 3.0% (w/w) glycine as a nitrogen source,
- (c) at least 50% (w/w) water,
- (d) less than 0.5% (w/w) of NaCl,
- (e) less than 5% (w/w) of glycerol, and
- (f) as an optional component, 0.5 to 4.5% (w/w) caprylic/capric triglycerides as a lipid source.

A particularly preferred skin care composition of the invention therefore has an osmolality of 4000 mOsm/kg water or less and comprises
- (a) 0.5 to 3.0% (w/w) glucose, fructose, saccharose, maltose, maltodextrin, pyruvic acid, pyruvate, lactic acid and/or lactate as a carbon source,
- (b) 0.5 to 3.0% (w/w) alanine as a nitrogen source,
- (c) at least 50% (w/w) water,
- (d) less than 0.5% (w/w) of NaCl,
- (e) less than 5% (w/w) of glycerol, and
- (f) as an optional component, 0.5 to 4.5% (w/w) caprylic/capric triglycerides as a lipid source.

A particularly preferred skin care composition of the invention therefore has an osmolality of 4000 mOsm/kg water or less and comprises
- (a) glucose, fructose, saccharose, maltose, maltodextrin, pyruvic acid, pyruvate, lactic acid and/or lactate as a carbon source, preferably in an amount of 0.05 to 5.0% (w/w),
- (b) at least 50% (w/w) water,
- (c) no NaCl,
- (d) no glycerol.

and at least one of the following:
- (e) alanine, glycine, urea and/or arginine as a nitrogen source, preferably in an amount of 0.05 to 5.0% (w/w),
- (f) caprylic/capric triglycerides as a lipid source preferably in an amount of 0.05 to 6.0% (w/w).

Another particularly preferred skin care composition of the invention therefore has an osmolality of 4000 mOsm/kg water or less and comprises
- (a) glucose, fructose, saccharose, maltose, maltodextrin, pyruvic acid, pyruvate, lactic acid and/or lactate as a carbon source, preferably in an amount of 0.05 to 5.0% (w/w),
- (b) at least 50% (w/w) water,
- (c) no NaCl,
- (d) no glycerol, and at least one of the following:
- (e) alanine, glycine, urea and/or arginine as a nitrogen source, preferably in an amount of 0.05 to 5.0% (w/w),
- (f) caprylic/capric triglycerides as a lipid source preferably in an amount of 0.05 to 6.0% (w/w).

Another particularly preferred skin care composition of the invention therefore has an osmolality of 4000 mOsm/kg water or less and comprises
- (a) glucose, fructose, saccharose, maltose, maltodextrin, pyruvic acid, pyruvate, lactic acid and/or lactate as a carbon source, preferably in an amount of 0.05 to 5.0% (w/w),
- (b) at least 50% (w/w) water,
- (c) no NaCl,
- (d) no glycerol, and at least one of the following:
- (e) alanine, glycine, urea and/or arginine as a nitrogen source, preferably in an amount of 0.05 to 5.0% (w/w),
- (f) caprylic/capric triglycerides as a lipid source preferably in an amount of 0.05 to 6.0% (w/w).

Another particularly preferred skin care composition of the invention therefore has an osmolality of 4000 mOsm/kg water or less and comprises
- (a) glucose, fructose, saccharose, maltose, maltodextrin, pyruvic acid, pyruvate, lactic acid and/or lactate as a carbon source, preferably in an amount of 0.05 to 5.0% (w/w),
- (b) at least 50% (w/w) water,
- (c) no NaCl,
- (d) no glycerol, and at least one of the following:
- (e) alanine, glycine, urea and/or arginine as a nitrogen source, preferably in an amount of 0.05 to 5.0% (w/w),
- (f) caprylic/capric triglycerides as a lipid source preferably in an amount of 0.05 to 6.0% (w/w).

A particularly preferred skin care composition of the invention therefore has an osmolality of 4000 mOsm/kg water or less and comprises
- (a) 0.05 to 5.0% (w/w) glucose, fructose, saccharose, maltose, maltodextrin, pyruvic acid, pyruvate, lactic acid and/or lactate as a carbon source,
- (b) 0.05 to 5.0% (w/w) urea as a nitrogen source,
- (c) at least 50% (w/w) water,
- (d) no NaCl,
- (e) no glycerol,
- (f) as an optional component, 0.05 to 6.0% (w/w) caprylic/capric triglycerides as a lipid source.

A particularly preferred skin care composition of the invention therefore has an osmolality of 4000 mOsm/kg water or less and comprises
- (a) 0.05 to 5.0% (w/w) glucose, fructose, saccharose, maltose, maltodextrin, pyruvic acid, pyruvate, lactic acid and/or lactate as a carbon source,
- (b) 0.05 to 5.0% (w/w) arginine as a nitrogen source,
- (c) at least 50% (w/w) water,
- (d) no NaCl,
- (e) no glycerol,
- (f) as an optional component, 0.05 to 6.0% (w/w) caprylic/capric triglycerides as a lipid source.

A particularly preferred skin care composition of the invention therefore has an osmolality of 4000 mOsm/kg water or less and comprises
- (a) 0.05 to 5.0% (w/w) glucose, fructose, saccharose, maltose, maltodextrin, pyruvic acid, pyruvate, lactic acid and/or lactate as a carbon source,
- (b) 0.05 to 5.0% (w/w) glycine as a nitrogen source,
- (c) at least 50% (w/w) water,
- (d) no NaCl,
- (e) no glycerol,
- (f) as an optional component, 0.05 to 6.0% (w/w) caprylic/capric triglycerides as a lipid source.

A particularly preferred skin care composition of the invention therefore has an osmolality of 4000 mOsm/kg water or less and comprises
- (a) 0.05 to 5.0% (w/w) glucose, fructose, saccharose, maltose, maltodextrin, pyruvic acid, pyruvate, lactic acid and/or lactate as a carbon source,
- (b) 0.05 to 5.0% (w/w) alanine as a nitrogen source,
- (c) at least 50% (w/w) water,
- (d) no NaCl,
- (e) no glycerol,
- (f) as an optional component, 0.05 to 6.0% (w/w) caprylic/capric triglycerides as a lipid source.

A particularly preferred skin care composition of the invention therefore has an osmolality of 4000 mOsm/kg water or less and comprises
- (a) 0.5 to 3.0% (w/w) glucose, fructose, saccharose, maltose, maltodextrin, pyruvic acid, pyruvate, lactic acid and/or lactate as a carbon source,
- (b) 0.5 to 3.0% (w/w) urea as a nitrogen source,
- (c) at least 50% (w/w) water,
- (d) no NaCl,
- (f) no glycerol,
- (f) as an optional component, 0.5 to 4.5% (w/w) caprylic/capric triglycerides as a lipid source.

A particularly preferred skin care composition of the invention therefore has an osmolality of 4000 mOsm/kg water or less and comprises
- (a) 0.5 to 3.0% (w/w) glucose, fructose, saccharose, maltose, maltodextrin, pyruvic acid, pyruvate, lactic acid and/or lactate as a carbon source,
- (b) 0.5 to 3.0% (w/w) arginine as a nitrogen source,
- (c) at least 50% (w/w) water,
- (d) no NaCl,
- (e) no glycerol,
- (f) as an optional component, 0.5 to 4.5% (w/w) caprylic/capric triglycerides as a lipid source.

A particularly preferred skin care composition of the invention therefore has an osmolality of 4000 mOsm/kg water or less and comprises
- (a) 0.5 to 3.0% (w/w) glucose, fructose, saccharose, maltose, maltodextrin, pyruvic acid, pyruvate, lactic acid and/or lactate as a carbon source,
- (b) 0.5 to 3.0% (w/w) glycine as a nitrogen source,
- (c) at least 50% (w/w) water,
- (d) no NaCl,
- (e) no glycerol,
- (f) as an optional component, 0.5 to 4.5% (w/w) caprylic/capric triglycerides as a lipid source.

A particularly preferred skin care composition of the invention therefore has an osmolality of 4000 mOsm/kg water or less and comprises
- (a) 0.5 to 3.0% (w/w) glucose, fructose, saccharose, maltose, maltodextrin, pyruvic acid, pyruvate, lactic acid and/or lactate as a carbon source,
- (b) 0.5 to 3.0% (w/w) alanine as a nitrogen source,
- (c) at least 50% (w/w) water,
- (d) no NaCl,
- (e) no glycerol,
- (f) as an optional component, 0.5 to 4.5% (w/w) caprylic/capric triglycerides as a lipid source.

Another particularly preferred skin care composition of the invention therefore has an osmolality of 4000 mOsm/kg water or less and comprises
- (a) pyruvic acid and/or pyruvate as a carbon source, preferably in an amount of 0.05 to 5.0% (w/w),
- (b) at least 50% (w/w) water,
- (c) less than 0.5% (w/w) of NaCl,
- (d) less than 5% (w/w) of glycerol.

and at least one of the following:
- (e) urea and/or arginine as a nitrogen source, preferably in an amount of 0.05 to 5.0% (w/w),
- (f) caprylic/capric triglycerides as a lipid source preferably in an amount of 0.05 to 6.0% (w/w).

Another particularly preferred skin care composition of the invention therefore has an osmolality of 4000 mOsm/kg water or less and comprises
- (a) pyruvic acid and/or pyruvate as a carbon source, preferably in an amount of 0.05 to 5.0% (w/w),
- (b) at least 50% (w/w) water,
- (c) less than 0.5% (w/w) of KCl,
- (d) less than 5% (w/w) of glycerol.

and at least one of the following:
- (e) urea and/or arginine as a nitrogen source, preferably in an amount of 0.05 to 5.0% (w/w),
- (f) caprylic/capric triglycerides as a lipid source preferably in an amount of 0.05 to 6.0% (w/w).

Another particularly preferred skin care composition of the invention therefore has an osmolality of 4000 mOsm/kg water or less and comprises
- (a) pyruvic acid and/or pyruvate as a carbon source, preferably in an amount of 0.05 to 5.0% (w/w),
- (b) at least 50% (w/w) water,
- (c) less than 0.5% (w/w) of $CaCl_2$,
- (d) less than 5% (w/w) of glycerol.

and at least one of the following:
- (e) urea and/or arginine as a nitrogen source, preferably in an amount of 0.05 to 5.0% (w/w),
- (f) caprylic/capric triglycerides as a lipid source preferably in an amount of 0.05 to 6.0% (w/w).

A particularly preferred skin care composition of the invention therefore has an osmolality of 4000 mOsm/kg water or less and comprises
- (a) 0.05 to 5.0% (w/w) pyruvic acid, pyruvate or a mixture thereof as a carbon source,
- (b) 0.05 to 5.0% (w/w) urea as a nitrogen source,
- (c) at least 50% (w/w) water,
- (d) less than 0.5% (w/w) of NaCl,
- (e) less than 5% (w/w) of glycerol, and
- (f) as an optional component, 0.05 to 6.0% (w/w) caprylic/capric triglycerides as a lipid source.

A particularly preferred skin care composition of the invention therefore has an osmolality of 4000 mOsm/kg water or less and comprises
- (a) 0.05 to 5.0% (w/w) pyruvic acid, pyruvate or a mixture thereof as a carbon source,
- (b) 0.05 to 5.0% (w/w) arginine as a nitrogen source,
- (c) at least 50% (w/w) water,
- (d) less than 0.5% (w/w) of NaCl,
- (e) less than 5% (w/w) of glycerol, and
- (f) as an optional component, 0.05 to 6.0% (w/w) caprylic/capric triglycerides as a lipid source.

A particularly preferred skin care composition of the invention therefore has an osmolality of 4000 mOsm/kg water or less and comprises
- (a) 0.5 to 3.0% (w/w) pyruvic acid or pyruvate or a mixture thereof as a carbon source,
- (b) 0.5 to 3.0% (w/w) urea as a nitrogen source,
- (c) at least 50% (w/w) water,
- (d) less than 0.5% (w/w) of NaCl,
- (e) less than 5% (w/w) of glycerol, and
- (f) as an optional component, 0.5 to 4.5% (w/w) caprylic/capric triglycerides as a lipid source.

A particularly preferred skin care composition of the invention therefore has an osmolality of 4000 mOsm/kg water or less and comprises
- (a) 0.5 to 3.0% (w/w) pyruvic acid or pyruvate or a mixture thereof as a carbon source,
- (b) 0.5 to 3.0% (w/w) arginine as a nitrogen source,
- (c) at least 50% (w/w) water,
- (d) less than 0.5% (w/w) of NaCl,
- (e) less than 5% (w/w) of glycerol, and
- (f) as an optional component, 0.5 to 4.5% (w/w) caprylic/capric triglycerides as a lipid source.

Another particularly preferred skin care composition of the invention therefore has an osmolality of 4000 mOsm/kg water or less and comprises
- (a) lactic acid and/or lactate as a carbon source, preferably in an amount of 0.05 to 5.0% (w/w),
- (b) at least 50% (w/w) water,
- (c) less than 0.5% (w/w) of NaCl,
- (d) less than 5% (w/w) of glycerol.

and at least one of the following:
- (e) urea and/or arginine as a nitrogen source, preferably in an amount of 0.05 to 5.0% (w/w),
- (f) caprylic/capric triglycerides as a lipid source preferably in an amount of 0.05 to 6.0% (w/w).

Another particularly preferred skin care composition of the invention therefore has an osmolality of 4000 mOsm/kg water or less and comprises
- (a) lactic acid and/or lactate as a carbon source, preferably in an amount of 0.05 to 5.0% (w/w),
- (b) at least 50% (w/w) water,
- (c) less than 0.5% (w/w) of KCl,
- (d) less than 5% (w/w) of glycerol.

and at least one of the following:
- (e) urea and/or arginine as a nitrogen source, preferably in an amount of 0.05 to 5.0% (w/w),
- (f) caprylic/capric triglycerides as a lipid source preferably in an amount of 0.05 to 6.0% (w/w).

Another particularly preferred skin care composition of the invention therefore has an osmolality of 4000 mOsm/kg water or less and comprises
- (a) lactic acid and/or lactate as a carbon source, preferably in an amount of 0.05 to 5.0% (w/w),
- (b) at least 50% (w/w) water,
- (c) less than 0.5% (w/w) of $CaCl_2$,
- (d) less than 5% (w/w) of glycerol.

and at least one of the following:
- (e) urea and/or arginine as a nitrogen source, preferably in an amount of 0.05 to 5.0% (w/w),
- (f) caprylic/capric triglycerides as a lipid source preferably in an amount of 0.05 to 6.0% (w/w).

A particularly preferred skin care composition of the invention therefore has an osmolality of 4000 mOsm/kg water or less and comprises
- (a) 0.05 to 5.0% (w/w) lactic acid or lactate or a mixture thereof as a carbon source,
- (b) 0.05 to 5.0% (w/w) urea as a nitrogen source,
- (c) at least 50% (w/w) water,
- (d) less than 0.5% (w/w) of NaCl,
- (e) less than 5% (w/w) of glycerol, and
- (f) as an optional component, 0.05 to 6.0% (w/w) caprylic/capric triglycerides as a lipid source.

A particularly preferred skin care composition of the invention therefore has an osmolality of 4000 mOsm/kg water or less and comprises
- (a) 0.05 to 5.0% (w/w) lactic acid or lactate or a mixture thereof as a carbon source,
- (b) 0.05 to 5.0% (w/w) arginine as a nitrogen source,
- (c) at least 50% (w/w) water,
- (d) less than 0.5% (w/w) of NaCl,
- (e) less than 5% (w/w) of glycerol, and
- (f) as an optional component, 0.05 to 6.0% (w/w) caprylic/capric triglycerides as a lipid source.

A particularly preferred skin care composition of the invention therefore has an osmolality of 4000 mOsm/kg water or less and comprises
- (a) 0.5 to 3.0% (w/w) lactic acid or lactate or a mixture thereof as a carbon source,
- (b) 0.5 to 3.0% (w/w) urea as a nitrogen source,
- (c) at least 50% (w/w) water,
- (d) less than 0.5% (w/w) of NaCl,
- (e) less than 5% (w/w) of glycerol, and
- (f) as an optional component, 0.5 to 4.5% (w/w) caprylic/capric triglycerides as a lipid source.

A particularly preferred skin care composition of the invention therefore has an osmolality of 4000 mOsm/kg water or less and comprises
- (a) 0.5 to 3.0% (w/w) lactic acid or lactate or a mixture thereof as a carbon source,
- (b) 0.5 to 3.0% (w/w) arginine as a nitrogen source,
- (c) at least 50% (w/w) water,
- (d) less than 0.5% (w/w) of NaCl,
- (e) less than 5% (w/w) of glycerol, and
- (f) as an optional component, 0.5 to 4.5% (w/w) caprylic/capric triglycerides as a lipid source.

A particularly preferred skin care composition of the invention therefore has an osmolality of 4000 mOsm/kg water or less and comprises
- (a) pyruvic acid, pyruvate, lactic acid, lactate or a mixture thereof as a carbon source, preferably in an amount of 0.05 to 5.0% (w/w),
- (b) at least 50% (w/w) water,
- (c) less than 0.5% (w/w) of NaCl,
- (d) less than 5% (w/w) of glycerol.

and at least one of the following:
- (e) urea and/or arginine as a nitrogen source, preferably in an amount of 0.05 to 5.0% (w/w),
- (f) caprylic/capric triglycerides as a lipid source preferably in an amount of 0.05 to 6.0% (w/w).

Another particularly preferred skin care composition of the invention therefore has an osmolality of 4000 mOsm/kg water or less and comprises
- (a) pyruvic acid, pyruvate, lactic acid, lactate or a mixture thereof as a carbon source, preferably in an amount of 0.05 to 5.0% (w/w),
- (b) at least 50% (w/w) water,
- (c) less than 0.5% (w/w) of KCl,
- (d) less than 5% (w/w) of glycerol.

and at least one of the following:
- (e) urea and/or arginine as a nitrogen source, preferably in an amount of 0.05 to 5.0% (w/w),
- (f) caprylic/capric triglycerides as a lipid source preferably in an amount of 0.05 to 6.0% (w/w).

Another particularly preferred skin care composition of the invention therefore has an osmolality of 4000 mOsm/kg water or less and comprises
- (a) pyruvic acid, pyruvate, lactic acid, lactate or a mixture thereof as a carbon source, preferably in an amount of 0.05 to 5.0% (w/w),
- (b) at least 50% (w/w) water,
- (c) less than 0.5% (w/w) of $CaCl_2$,
- (d) less than 5% (w/w) of glycerol.

and at least one of the following:
- (e) urea and/or arginine as a nitrogen source, preferably in an amount of 0.05 to 5.0% (w/w),
- (f) caprylic/capric triglycerides as a lipid source preferably in an amount of 0.05 to 6.0% (w/w).

The skin care composition of the present invention can further comprise additional compounds which are normally present in topical skin compositions. For example, the skin care composition of the present invention can further comprise at least one compound selected from the group consisting of perfumes, emollients, pigments, thickener, fillers, colorants, antioxidants, surfactants, lubricants, stabilizers, preservatives, solubilizers, emulsifiers and combinations of any of these. In a preferred embodiment, the compositions of the invention comprise hydrolyzed milk protein and/or a ginger compound, such as *Zingiber officinale* root juice, as additional components.

The skin care compositions described herein are particularly useful for promoting and maintaining a healthy skin microbiome. The compositions preferably increase the overall number of microorganisms, more preferably the overall number of bacteria, in a skin areal to which the skin care compositions are applied. It is particularly preferred that the overall number of microorganisms, more preferably the overall number of bacteria, is increased after daily topical application of the composition over a period of 2-4 weeks by at least 2.5%, by at least 5%, by at least 7.5%, by at least 10%, by at least 12.5%, or by at least 15% relative to an untreated areal of the part of the body. It is particularly preferred that the number of bacteria of the species *S. epidermidis* is increased after daily topical application of the composition over a period of 2-4 weeks. Preferably, the number of *S. epidermidis* is increased by at least 2.5%, by at least 5%, by at least 7.5%, by at least 10%, by at least 12.5%, or by at least 15% relative to an untreated areal of the part of the body.

The compositions of the invention are useful for therapeutic purposes, in particular for preventing or treating skin diseases like acne. Hence, in another aspect the invention provides a skin care composition as defined hereinabove for use in a method of treating a skin disease, preferably acne. In one embodiment, the skin care composition is used for preventing the formation of acne. In another embodiment, the skin care composition is used for treating an acute state of acne. In yet another preferred embodiment, the skin care composition is used for preventing the reoccurrence of acne in a subject who has received a standard acne treatment. It is particularly preferred that the subject is a human.

The invention also provides methods for treating the skin of a subject by administering a skin care composition as described hereinabove. In one aspect, a method of treating a skin disease, preferably acne, is provided, said method comprising the topical administration of a skin care composition as described hereinabove.

Apart from therapeutic uses, any of the above compositions of the invention described in detail above can be used for non-therapeutic, cosmetic purposes, e.g. for promoting the development of or stabilizing a healthy skin microbiome, for improving the appearance of the skin of a subject, for maintaining healthy skin, or for promoting bacterial growth of the skin microbiome. Accordingly, the present invention also relates to the use, preferably the non-therapeutic use, of a composition comprising
- (a) a carbon source selected from the group consisting of glucose, fructose, saccharose, maltose, maltodextrin, pyruvic acid, pyruvate, lactic acid and/or lactate, and at least one of following components:
- (b) a nitrogen source selected from the group of alanine, glycine, arginine and/or urea;
- (c) caprylic/capric triglycerides as a lipid source.

Hence, the invention also relates to the use, preferably the non-therapeutic use, of a composition comprising a carbon source, which either is glucose, fructose, saccharose, maltose, maltodextrin, pyruvic acid, pyruvate, lactic acid, lactate or a combination of any of these, and at least one additional growth-enhancing compound. The additional growth-enhancing compound can be a nitrogen source selected from urea, alanine, glycine and arginine or caprylic/capric triglycerides as a lipid source. In a particularly preferred embodiment, the composition comprises all three types of components. Accordingly, in a preferred aspect, the invention relates to the use, preferably the non-therapeutic use, of a composition comprising
- (a) glucose, fructose, saccharose, maltose, maltodextrin, pyruvic acid, pyruvate, lactic acid, and/or lactate as a carbon source, (b) alanine, glycine, arginine and/or urea as a nitrogen source,
(c) caprylic/capric triglycerides as a lipid source.

More preferably, the present invention relates to the use, preferably the non-therapeutic use, of a composition comprising
(a) pyruvic acid, pyruvate, lactic acid, lactate or mixtures thereof as a carbon source, and
at least one of following components:
(b) urea and/or arginine as a nitrogen source;
(c) caprylic/capric triglycerides as a lipid source.

Hence, the invention also relates to the use, preferably the non-therapeutic use, of a composition comprising a carbon source, which either is pyruvic acid, pyruvate, lactic acid, lactate or mixtures thereof, e.g. a combination of pyruvate and lactate, and at least one additional growth-enhancing compound. The additional growth-enhancing compound can be a nitrogen source selected from urea and arginine or caprylic/capric triglycerides as a lipid source. In a particularly preferred embodiment, the composition comprises all three types of components.

Accordingly, in a preferred aspect, the invention relates to the use, preferably the non-therapeutic use, of a composition comprising
(a) pyruvic acid, pyruvate lactic acid, lactate or mixtures thereof as a carbon source,
(b) urea and/or arginine as a nitrogen source,
(c) caprylic/capric triglycerides as a lipid source.

Accordingly, in a more preferred aspect the present invention also relates to the use, preferably the non-therapeutic use, of a composition
(a) a carbon source selected from the group consisting of pyruvic acid, pyruvate, lactic acid lactate,
(b) a nitrogen source selected from the group consisting of urea and arginine; and/or
(c) caprylic/capric triglycerides
for promoting the development of or stabilizing a healthy skin microbiome or for promoting bacterial growth of the skin microbiome. In one embodiment, pyruvic acid, pyruvate or a mixture thereof is used as a carbon source for promoting the development of or stabilizing a healthy skin microbiome or for promoting bacterial growth of the skin microbiome. The pyruvate can be, for example, calcium or sodium pyruvate. More preferably, the pyruvic acid, pyruvate or a mixture thereof is used in combination with urea and/or arginine as a nitrogen source for promoting the development of or stabilizing a healthy skin microbiome or for promoting bacterial growth of the skin microbiome. Most preferably, the pyruvic acid, pyruvate or a mixture thereof is used in combination with urea and/or arginine as a nitrogen source and caprylic/capric triglycerides as a lipid source for promoting the development of or stabilizing a healthy skin microbiome or for promoting bacterial growth of the skin microbiome.

In another embodiment, lactate is used as a carbon source for promoting the development of or stabilizing a healthy skin microbiome or for promoting bacterial growth of the skin microbiome. The lactate can be, for example, calcium or sodium lactate. More preferably, the lactate is used in combination with urea and/or arginine as a nitrogen source for promoting the development of or stabilizing a healthy skin microbiome or for promoting bacterial growth of the skin microbiome. Most preferably, the lactate is used in combination with urea and/or arginine as a nitrogen source and caprylic/capric triglycerides as a lipid source for promoting the development of or stabilizing a healthy skin microbiome or for promoting bacterial growth of the skin microbiome.

BRIEF DESCRIPTION OF THE DRAWINGS

FIG. 3A shows the results from measuring skin hydration with a corneometer after application of compositions of the invention to the thigh skin for four weeks in an in vivo study. FIG. 3B shows the results of the cell count measurements from the same study. It can be seen that the compositions of the invention led to significant skin hydration both after 2 and 4 weeks. Also, the compositions led to an increase in the cell number in the microbiome.

DETAILED DESCRIPTION OF EXEMPLARY EMBODIMENTS OF THE INVENTION

The present invention is further illustrated by the following examples, which in no way should be construed as limiting. The entire contents of all of the references (including literature references, issued patents, published patent applications, and co pending patent applications) cited throughout this application are hereby expressly incorporated by reference.

Example 1: In Vitro Growth Assays

Potential growth-enhancing compounds that are effective in the stabilization of the microbiome were tested by the following in vitro assay. Overnight cultures of *S. epidermidis* is inoculated in 20 ml CASO medium and incubated at 37° C. The culture was then diluted and adjusted to an OD600 of 0.25. From this suspension, the starting culture is prepared with a concentration of $5 \times 10^5$ CFU/ml by a 1:200 dilution in CASO deficiency medium. Subsequently, solutions containing the different active ingredients were mixed with the start cultures and incubated in a thermal mixer at 37° C. by shaking. Samples are taken at the respective time points for testing, diluted with NaCl and plated out on CASO plates using the spiral plater. The plates are incubated for 24 h at 37° C. and then counted.

Figure 1:
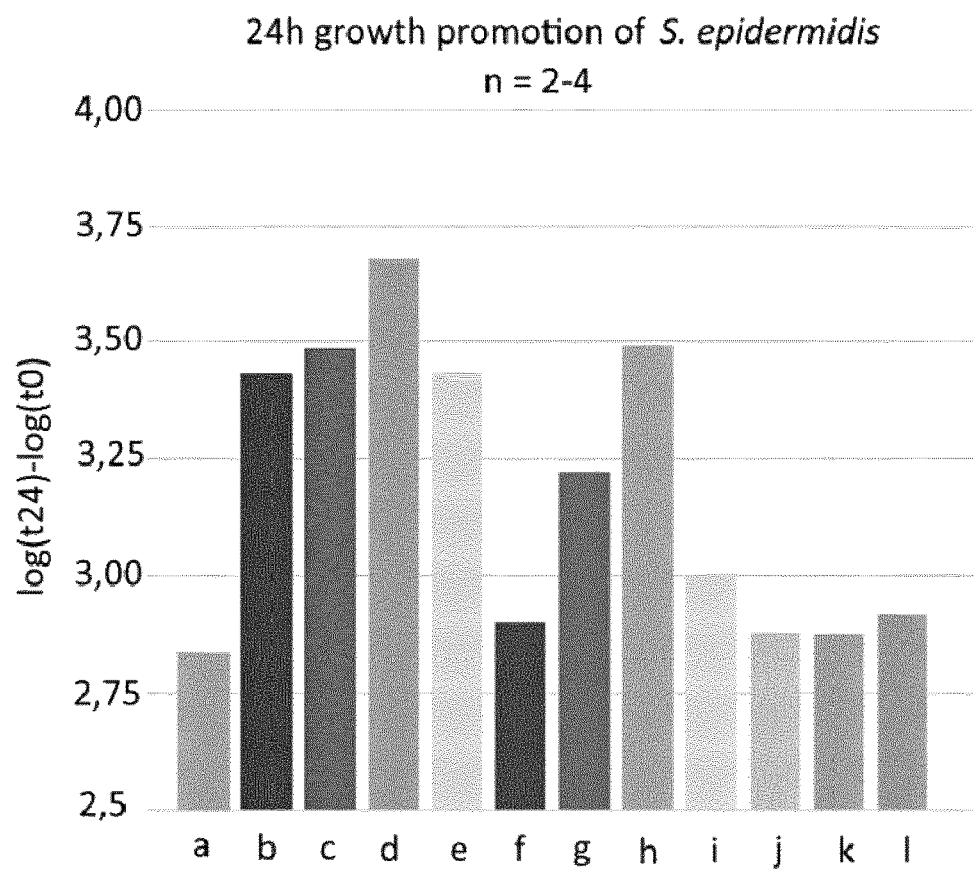
FIG. 1 shows the results from in vitro studies for promoting bacterial cell growth. It can be seen that the addition of pyruvate or lactate as a carbon source, either alone or in combination with a nitrogen source and/or a lipid source, induced a significant growth of *S. epidermidis* within 24 hours.
Figure 2:
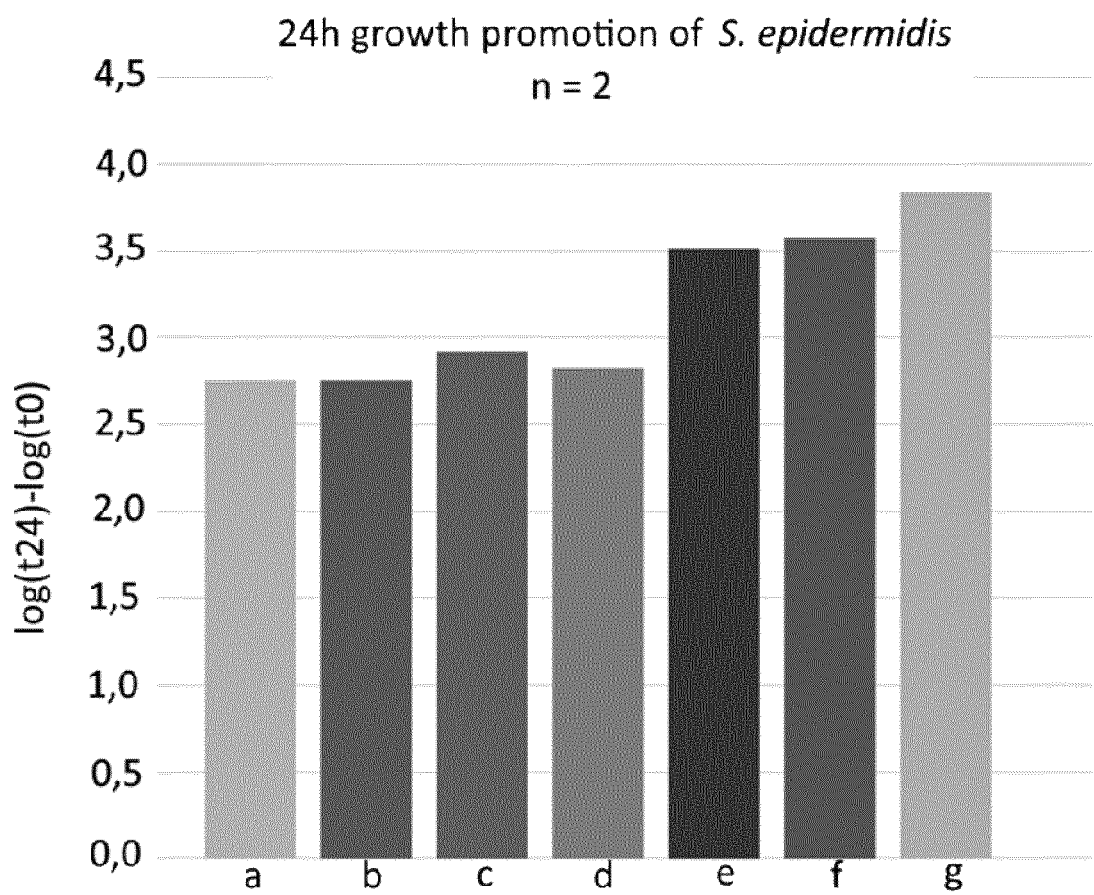
FIG. 2 shows further results from in vitro studies for promoting bacterial cell growth. It can be seen that the addition of pyruvate, either alone or in combination with arginine, resulted in a significant growth of *S. epidermidis* within 24 hours.

Results: The results can be shown in FIGS. 1 and 2. It can be taken from these figures that the addition of pyruvate or lactate to the low nutrient medium significantly promotes the growth of *S. epidermidis* within the 24 hours test period. The growth of the organism can even be further promoted by adding urea, argine or caprylic/capric triglycerides to the pyruvate or lactate.

Example 2: In Vivo Study

An in vivo study with 31 volunteers was conducted to examine whether the growth-enhancing compounds that were found effective in the in vitro test can also promote cell growth of the microorganisms in the skin microbiome in vivo when applied to the skin in the form of a lotion. For this purpose, a carrier lotion was prepared to which the test compounds, i.e. the compounds identified as growth-enhancing in the in vitro assays of Example 1, were added.

The composition of the carrier lotion is described in the following table.

TABLE 1

Composition of the carrier lotion

| INCI | wt. % |
| --- | --- |
| ethylhexyl salicylate | 5.00 |
| butyrospermum parkii butter | 4.50 |
| polysorbate 60 | 2.50 |
| glycerin | 1.50 |
| 4-methylbenzylidene camphor | 1.00 |
| glyceryl stearate | 1.00 |
| PEG-100 stearate | 1.00 |
| C12-15 alkyl benzoate | 1.00 |
| panthenol | 1.00 |
| phenoxyethanol | 0.70 |
| butyl methoxydibenzoylmethane | 0.60 |
| oryza sativa starch | 0.50 |
| hydroxyacetophenone | 0.40 |
| ethylhexylglycerin | 0.30 |
| tocopheryl acetate | 0.10 |
| tetrasodium glutamate diacetate | 0.10 |
| aqua | ad 100% |

The test formulations were prepared by mixing the compounds to be tested into the carrier lotion. The test formulations were composed as follows:

Formulation 20: Carrier lotion+1% urea, 0.3% pyruvate, 1% caprylic/capric triglycerides Formulation 30: Carrier lotion+1% urea, 1% sodium Lactate Formulation 40: Carrier lotion+1% urea, 1% sodium Lactate, 1% caprylic/capric triglycerides For preconditioning, the study participants ceased to cream the thighs or wash them with shower gel or soap 1 week before the start of the study. 4 test areas were marked on the thighs of each participant (01 untreated control/test formulation 20/test formulation 30/test formulation 40). The above test formulations were applied two times a day within the marked areas of the thighs in the morning and evening by the test person at home. After 2 weeks and after 4 weeks, the hydration of the skin in the test areas was measured and samples of the microbiome were collected by swabbing on the thighs.

Example 3: Test Area and Sample Analysis

The microbiome samples obtained from the in vivo study of Example 2 were analyzed by microbial colony count and bacterial diversity via 16S rRNA amplicon sequencing. In addition, the tested skin areal was analyzed by measuring skin hydration.

For measuring skin hydration, the skin areas of the study participants were measured with a Corneometer CM 825 (Courage & Khazaka, Cologne, Germany) using 5 repeated measurements. Skin hydration was expressed as permittivity in arbitrary units [a. u.], wherein an increase indicates an improved skin hydration.

For measuring the microbial colony count, the test site was rinsed with swabs (FLOQSwabs, Hain Lifescience GmbH, Nehren, Germany) by 3×10 lanes using 2 ml rinsing buffer (12.49 g/L $Na_2HPO$; 0.63 g/L $KH_2PO_4$ in molecular grade $H_2O$) in 15 ml Falcon tubes. The sample material was then plated within 60 minutes after collection on Columbia-Sheep-Blood-Tween (COST) agar plates and subsequently incubated. Specifically, 10 µl of the rinsing buffer was diluted in 990 µl 0.9% NaCl solution (1:100), and 100 µl of this dilution as well as 100 µl of the undiluted rinse was placed on COST plates with the spiral plater and subsequently incubated at 37° C. for 24 h. After incubation, the bacterial colonies on agar plates were counted using the Countermat Flash.

For the molecular 16S rRNA analysis, the microorganisms obtained by rinsing the test site were subjected to the DNA extraction, 16S rRNA amplicon sequencing and subsequent bioinformatics analysis. The aim of this analysis was to detect changes in the bacterial diversity compared to baseline which would indicate an influence of the test formulation on the composition of the skin microbiome.

Figure 3:
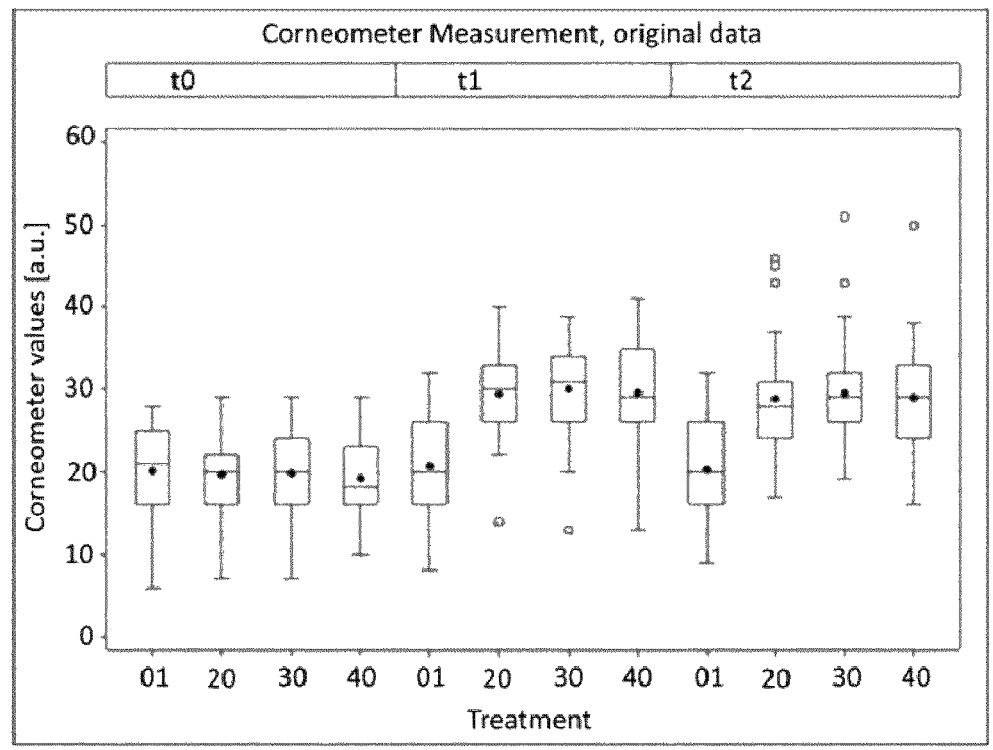
FIG. 3 shows the results from the analysis of skin hydration and cell count in a volunteer study. More specifically.
Figure 3:
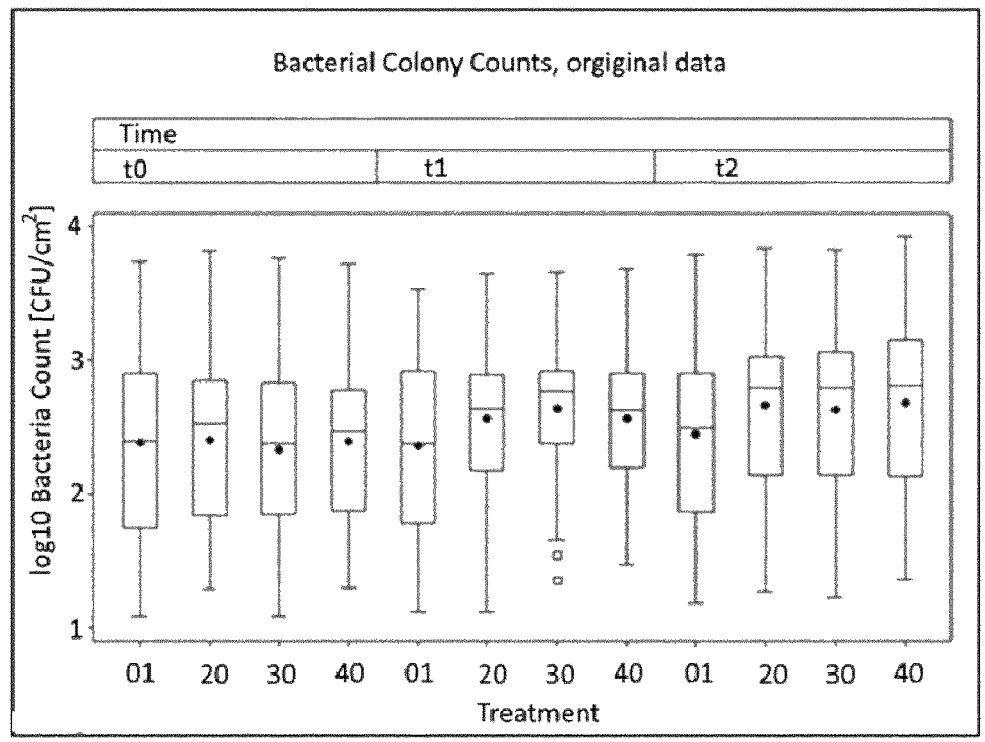
Figure 4:
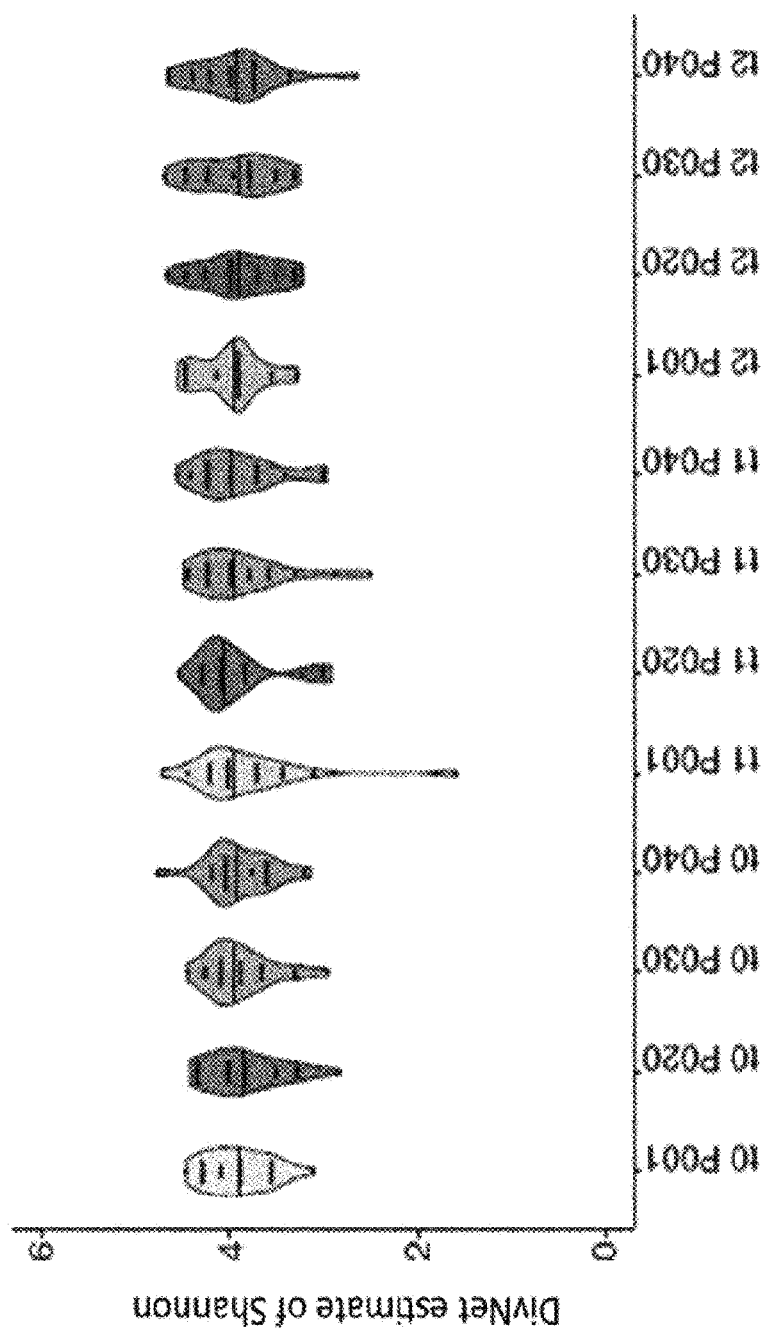
FIG. 4 shows the results from 16S amplicon sequencing after applying the composition of the invention in vivo. No changes in the alpha and beta diversity were observed between the treatment group and the control group.

Results: The results of skin hydration measurements are depicted in FIG. 3. As can be seen in FIG. 3A, the test formulations provide for a significant skin hydration both after 2 and 4 weeks. In addition, as shown in FIG. 3B, the test formulations led to significant increase in the cell count. FIG. 4 shows the results from 16S amplicon sequencing. No evident changes in the alpha and beta diversity were observed between the treatment group and the control group. Accordingly, the test formulations stabilize the skin microbiome and promote growth of the bacteria in the skin microbiome without changing the composition of the microbiome.

Example 4: In Vitro Growth Assays (OD)

Potential growth-enhancing compounds that are effective in the stabilization of the microbiome were tested by the following in vitro assay. Overnight cultures of *S. epidermidis* were inoculated in 20 ml CASO medium and incubated at 37° C. The culture was then diluted and adjusted to an OD600 of 0.25. From this suspension, the starting culture is prepared with a concentration of $5 \times 10^5$ CFU/ml by a 1:200 dilution in CASO deficiency medium. Subsequently, solutions containing the different nitrogen, carbon, and lipid sources were mixed with the start cultures and 200 µl/well were pipetted into a 96 well flat transparent plate, at least in triplets. The plate was placed in a Tecan Reader at 37° C. and Absorption was measured at 600 nm every hour over a period of 24-30 h.

Results: The results of the in vitro growth tests is depicted in the below tables 2 and 3. It can be seen in Table 2 that the carbon sources glucose, fructose, saccharose, maltose, maltodextrin, pyruvate and lactate support the growth of *S. epidermidis*. Further, Table 3 shows that also the combination of the carbon source pyruvate with nitrogen sources like urea, alanine (Ala) and arginine (Arg) supports growth. In addition, a combination of the carbon source pyruvate or lactate with caprylic/capric triglycerides (FettK12) supports growth.

TABLE 2

Results from in vitro growth assays

| | Growth S. epidermidis | | |
|---|---|---|---|
| Substance | 0.10% | 1.00% | 5.00% |
| Glucose | ++ | ++ | ++ |
| Pyruvate | + | ++ | ++ |
| Fructose | + | ++ | ++ |
| Maltose | + | ++ | ++ |
| Sucrose | + | ++ | ++ |
| Maltodextrin | + | ++ | ++ |
| Mannitol | X | X | X |
| Sorbitol | X | X | X |
| Xylitol | X | X | X |
| Lactate | + | ++ | X |

TABLE 3

Results from in vitro growth assays

| | Growth S. epidermidis | | |
|---|---|---|---|
| Substance | 0.1% | 1.00% | 5.00% |
| Pyruvate | + | ++ | + |
| Arg +Ala | | X | |
| Arg + Pyr | | ++ | |
| Ala + Pyr | | ++ | |
| Ala + Arg + Pyr | | ++ | |
| Pyruvate | | ++ | |
| Pyruvate + Urea | | ++ | |
| Pyruvate + Urea + Fettk12 | | ++ | |
| Pyruvate + Fettk 12 | | ++ | |
| Lactate | | ++ | |
| Lactate+ Urea | | ++ | |
| Lactate+ Urea + Fettk12 | | ++ | |
| Lactate+ Fettk12 | | ++ | |
| Urea | | X | |
| Urea + Fettk12 | | + | |
| Fettk 12 | | + | |

Example 5: Preparation of Shower Formulas

To demonstrate that the microbiome-promoting compositions of the invention can be formulated for different skin application, two shower formulations (referred to in the below table as Formula A and B, respectively) were prepared. Formula A contained a ginger compound (*Zingiber officinale* root juice) as an additional additive. Formula B contained hydrolyzed milk protein as an additional additive. Both formulas were tested and turned out to be highly suitable for shower applications.

TABLE 4

Shower formulations

| INCI | Formula A m [%] | Formula B m [%] |
|---|---|---|
| Sodium Myreth Sulfate + Aqua | 4.30 | 4.30 |
| Sodium Laureth Sulfate + Aqua | 4.30 | 4.30 |
| Aqua + Cocamidopropyl Betaine + Citric Acid | 8.83 | 8.83 |
| Aqua + Coco-Glucoside + Hydrogenated Castor Oil + Citric Acid + Benzoic Acid | 1.50 | 1.50 |
| Aqua | 74.01 | 74.46 |
| Sodium Chloride | 1.50 | 0.90 |
| Sodium Benzoate | 0.45 | 0.45 |
| Aqua + Coco-Glucoside + Glycol Distearate + Citric Acid + Glycerin | 4.00 | 4.00 |
| Citric Acid | 0.40 | 0.40 |
| Parfum | 0.65 | |
| Parfum | | 0.80 |
| Caprylic/Capric Triglyceride | 0.01 | 0.01 |
| Aqua + Sodium Lactate | 0.02 | 0.02 |
| Hydrolyzed Milk Protein | | 0.01 |
| Glycerin + Aqua + Zingiber Officinale Root Juice + Sodium Benzoate + Lactic Acid + Potassium Sorbate | 0.01 | |
| Urea | 0.01 | 0.01 |
| Lactic Acid + Aqua | 0.012 | 0.012 |
| Summen: | 100.00 | 100.00 |

What is claimed is:

1. A method of promoting bacterial growth of *Staphylococcus epidermidis* in the skin microbiome, wherein the method comprises applying to human skin a skin care composition in an amount which is effective for promoting bacterial growth of *Staphylococcus epidermidis* in the skin microbiome, the composition being formulated for topical application to skin and comprising
    (a) a carbon source selected from one or more of glucose, fructose, saccharose, maltose, maltodextrin, pyruvic acid, pyruvate, lactic acid and lactate,
    (b) a nitrogen source selected from one or more of alanine, glycine, arginine and urea, and
    (c) caprylic/capric triglycerides,
    (a) being present in a concentration of from 0.05% to 5.0% (w/w), (b) being present in a concentration of from 0.05% to 5.0% (w/w) and (c) being present in a concentration of from 0.05% to 6.0% (w/w).

2. The method of claim 1, wherein (a) comprises glucose.

3. The method of claim 2, wherein glucose is present in a concentration of from 0.05% to 3.0% (w/w).

4. The method of claim 1, wherein (a) comprises fructose.

5. The method of claim 4, wherein fructose is present in a concentration of from 0.05% to 3.0% (w/w).

6. The method of claim 1, wherein (b) comprises glycine.

7. The method of claim 6, wherein glycine is present in a concentration of from 0.05% to 3.0% (w/w).

8. The method of claim 1, wherein (b) comprises alanine.

9. The method of claim 8, wherein alanine is present in a concentration of from 0.05% to 3.0% (w/w).

10. The method of claim 1, wherein the composition comprises from 0.5% to 3.0% (w/w) of (a), from 0.1% to 3.0% (w/w) of (b) and from 0.5% to 4.5% (w/w) of (c).

11. The method of claim 1, wherein the composition comprises glucose and alanine.

12. The method of claim 11, wherein the composition comprises from 0.5% to 3.0% (w/w) glucose, from 0.1% to 3.0% (w/w) alanine and from 0.5% to 4.5% (w/w) caprylic/capric triglycerides.

13. The method of claim 1, wherein the composition comprises (a) one or more of pyruvic acid, pyruvate, lactic acid, lactate and at least one of (b) urea, arginine.

14. The method of claim 13, wherein the composition comprises from 0.5% to 3.0% (w/w) lactic acid and/or lactate; from 0.1% to 3.0% (w/w) urea; and from 0.5% to 4.5% (w/w) caprylic/capric triglycerides.

15. The method of claim 1, wherein the composition further comprises at least one of a perfume, an emollient, a pigment, a thickener, a filler, a colorant, an antioxidant, a surfactant, a lubricant, a stabilizer, a preservative, a solubilizer, an emulsifier.

16. The method of claim 1, wherein the composition has a theoretical osmolality of not more than 4,000 mOsm/kg.

17. The method of claim 16, wherein the composition has a theoretical osmolality of from 3,000 mOsm/kg to 4,000 mOsm/kg.

18. The method of claim 1, wherein the composition comprises at least 50% by weight of water, based on a total weight of the composition.

19. The method of claim 18, wherein the composition comprises at least 70% by weight of water.

20. The method of claim 1, wherein the composition is effective in the prevention and/or treatment of acne.

\* \* \* \* \*